United States Patent
Kamio et al.

(10) Patent No.: US 11,030,723 B2
(45) Date of Patent: Jun. 8, 2021

(54) IMAGE PROCESSING APPARATUS, IMAGE PROCESSING METHOD, AND PROGRAM

(71) Applicant: SONY CORPORATION, Tokyo (JP)

(72) Inventors: Kazunori Kamio, Kanagawa (JP); Takahiro Nagano, Kanagawa (JP); Yuki Tokizaki, Tokyo (JP); Yiwen Zhu, Kanagawa (JP); Satoshi Kawata, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 60 days.

(21) Appl. No.: 16/475,800

(22) PCT Filed: Dec. 1, 2017

(86) PCT No.: PCT/JP2017/043311
§ 371 (c)(1),
(2) Date: Jul. 3, 2019

(87) PCT Pub. No.: WO2018/150685
PCT Pub. Date: Aug. 23, 2018

(65) Prior Publication Data
US 2019/0355097 A1    Nov. 21, 2019

(30) Foreign Application Priority Data
Feb. 20, 2017   (JP) .............................. JP2017-029353

(51) Int. Cl.
*G06T 5/00* (2006.01)
*G06K 9/46* (2006.01)
*G06T 5/20* (2006.01)
(52) U.S. Cl.
CPC ................ *G06T 5/001* (2013.01); *G06K 9/46* (2013.01); *G06T 5/20* (2013.01); *G06T 2207/20081* (2013.01)

(58) Field of Classification Search
CPC . G06T 5/001; G06T 5/20; G06T 2207/20081; G06T 3/4061;
(Continued)

(56) References Cited

U.S. PATENT DOCUMENTS 6,323,905 B1    11/2001   Kondo et al.
2017/0372444 A1*  12/2017  Hosokawa ......... G06K 9/00369

FOREIGN PATENT DOCUMENTS

JP    2011-211387 A    10/2011
JP    2013-248319 A    12/2013

OTHER PUBLICATIONS

Jun et al. ("Upscaling Faces for Recognition Systems using Trained Filters", Interactive Multimedia for Consumer Eelctronics, ACM, 2 Penn Plaza, Suite 701 New York NY 10121-0701 USA, Oct. 23, 2009 (Oct. 23, 2009), pp. 105-112, XP058210392, DOI: 10.1145/1631040.1631057 ISBN: 978-1-60558-758-5) (Year: 2009).*

(Continued)

*Primary Examiner* — Ping Y Hsieh
(74) *Attorney, Agent, or Firm* — Paratus Law Group, PLLC

(57) ABSTRACT

There is provided an apparatus and a method that perform a process of improving the quality of a low-quality image such as a far-infrared image. The apparatus includes an image correction unit that repeatedly performs an image correction process using a plurality of processing units in at least two stages. The image correction unit inputs a low-quality image to be corrected and a high-quality image which is a reference image. Each of the processing units in each stage performs a correction process for the low-quality image, using a class correspondence correction coefficient corresponding to a feature amount extracted from a degraded image of the high-quality image. A processing unit in a previous stage performs the correction process, using a class correspondence correction coefficient corresponding to a feature (Continued)

amount extracted from an image which has a higher degradation level than that in a processing unit in a subsequent stage.

15 Claims, 20 Drawing Sheets

(58) Field of Classification Search
CPC . G06T 2207/20012; G06T 2207/30252; G06T 2207/10024; G06T 2207/10048; G06T 2207/10064; G06K 9/46; H04N 5/232; H04N 7/18; H04N 9/07
See application file for complete search history.

(56) References Cited

OTHER PUBLICATIONS

Dec. 16, 2019, European Search Report issued for related EP Application No. 17896603.2.
Rong et al., Upscaling Faces for Recognition Systems using Trained Filters, Interactive Multimedia for Consumer Electronics, Oct. 23, 2009, pp. 105-112, Beijing, China.
Short et al., Dimensionality analysis of facial signatures in visible and thermal spectra, Proceedings of SPIE, Jun. 5, 2015, pp. 947413-1-947413-10, vol. 9474.

* cited by examiner

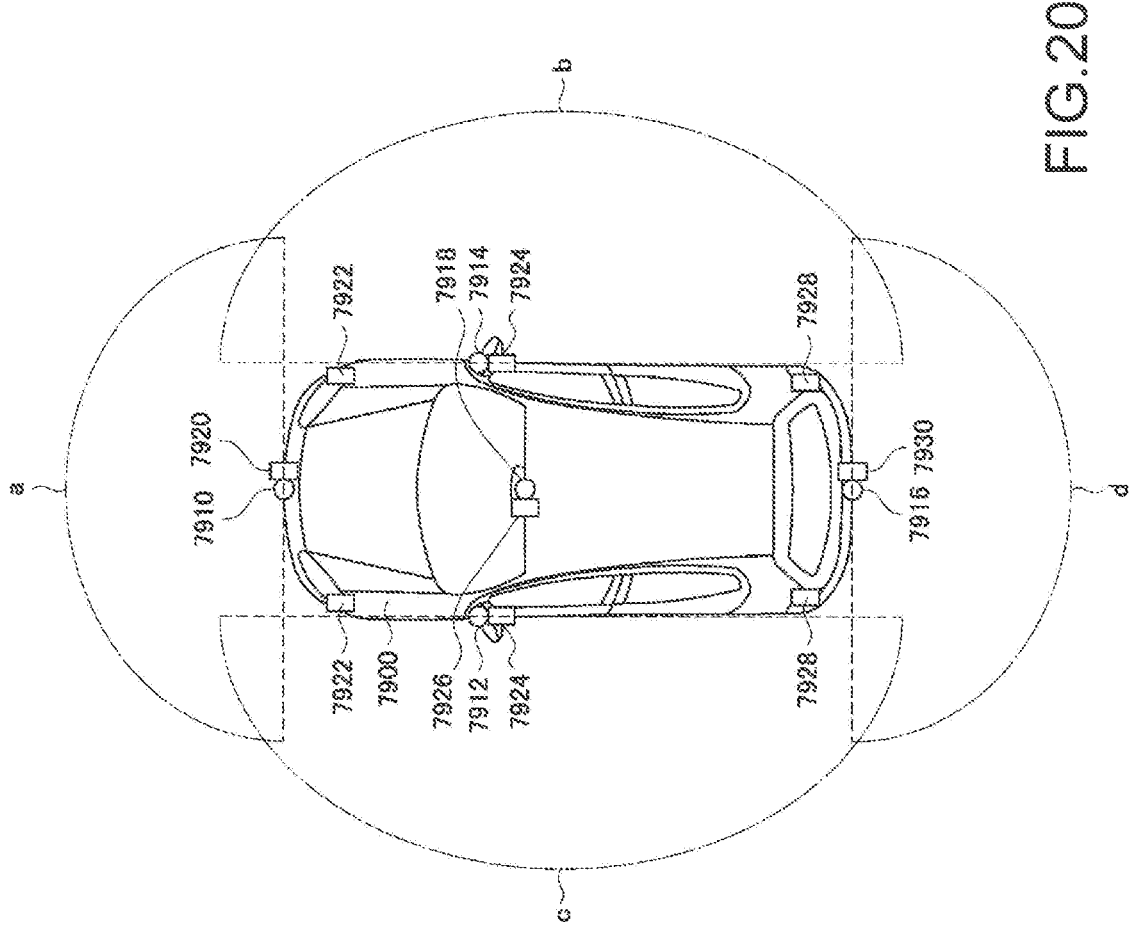

IMAGE PROCESSING APPARATUS, IMAGE PROCESSING METHOD, AND PROGRAM

CROSS REFERENCE TO PRIOR APPLICATION

This application is a National Stage Patent Application of PCT International Patent Application No. PCT/JP2017/043311 (filed on Dec. 1, 2017) under 35 U.S.C. § 371, which claims priority to Japanese Patent Application No. 2017-029353 (filed on Feb. 20, 2017), which are all hereby incorporated by reference in their entirety.

TECHNICAL FIELD

The present disclosure relates to an image processing apparatus, an image processing method, and a program. In particularly, the present disclosure relates to an image processing apparatus, an image processing method, and a program that perform image processing for improving image quality.

BACKGROUND ART

In recent years, a system has been widely used in which a visible camera that captures a visible image and a far-infrared camera that can capture, for example, an image of a person even at night when it is difficult to capture images with visible light are combined.

An imaging apparatus using two cameras is disclosed in, for example, Patent Literature 1 (JP-A-2011-211387).

However, in general, an infrared image captured by an infrared camera has a problem that the resolution thereof is lower than the resolution of a visible image.

In addition, a visible image which is a general color image is also used in an endoscope that captures the image of the inside of a living body. In recent years, a fluorescent image different from the visible image has been used.

The fluorescent image is, for example, an image obtained by emitting excitation light in a specific wavelength range and capturing fluorescence included in light reflected from a substance in the living body.

The fluorescent image can express, for example, a difference in intensity corresponding to a lesion in the living body and the use of the fluorescent image makes it possible to effectively analyze, for example, the progress of a disease.

It should be noted that an endoscopic apparatus using a visible image and a fluorescent image is disclosed in, for example, Patent Literature 2 (JP-A-2013-248319).

However, similarly to the above-mentioned infrared image, the fluorescent image also has the disadvantage that only an image having a lower resolution than the visible image is obtained and image quality is reduced. In particular, for an image of, for example, a blood vessel at a deep position in the living body, a clear image is not obtained since a larger amount of scattered light is generated in the living body.

CITATION LIST

Patent Literature

Patent Literature 1: JP-A-2011-211387
Patent Literature 2: JP-A-2013-248319

DISCLOSURE OF INVENTION

Technical Problem

The present disclosure has been made in view of, for example, the above-mentioned problems and an object of the present disclosure is to provide an image processing apparatus, an image processing method, and a program that improve the quality of a low-quality image, such as a far-infrared image or a fluorescent image, using image processing to generate a high-quality image.

Solution to Problem

In accordance with a first aspect of the present disclosure, there is provided an image processing apparatus including an image correction unit that repeatedly performs an image correction process using a plurality of processing units in at least two stages which include first-stage to final-stage processing units. The image correction unit inputs a low-quality image which is an image to be corrected and a high-quality image which is a reference image. Each of the plurality of processing units in each stage performs a correction process for the low-quality image, using a class correspondence correction coefficient classified in accordance with a class corresponding to a feature amount extracted from the high-quality image or a degraded image of the high-quality image. The class correspondence correction coefficient is generated by a learning process.

In addition, according to a second aspect of the present disclosure, there is provided an image processing method to be performed in an image processing apparatus including an image correction unit that repeatedly performs an image correction process using a plurality of processing units in at least two stages which include first-stage to final-stage processing units. The image processing method includes: an image input step of allowing the image correction unit to input a low-quality image which is an image to be corrected and a high-quality image which is a reference image; and a correction step of allowing each of the plurality of processing units in each stage to perform a correction process for the low-quality image, using a class correspondence correction coefficient classified in accordance with a class corresponding to a feature amount extracted from the high-quality image or a degraded image of the high-quality image. The class correspondence correction coefficient used in the correction step is generated by a learning process.

Further, according to a third aspect of the present disclosure, there is provided a program that causes an image processing apparatus including an image correction unit that repeatedly performs an image correction process using a plurality of processing units in at least two stages which include first-stage to final-stage processing units to perform image processing. The program causes the image correction unit to perform an image input step of inputting a low-quality image which is an image to be corrected and a high-quality image which is a reference image and causes each of the plurality of processing units in each stage to perform a correction step of performing a correction process for the low-quality image, using a class correspondence correction coefficient classified in accordance with a class corresponding to a feature amount extracted from the high-quality image or a degraded image of the high-quality image. The class correspondence correction coefficient used in the correction step is generated by a learning process.

It should be noted that, for example, the program according to the present disclosure can be provided by a storage medium or a communication medium which is provided in a computer-readable form to an information processing apparatus or a computer system capable of executing various program codes. Since the program is provided in a computer readable form, processes corresponding to the program are implemented in the information processing apparatus or the computer system.

Other objects, features, and advantages of the present disclosure will become apparent from the more detailed description based on the embodiments of the present disclosure which will be described below and the accompanying drawings. It should be noted that, in the specification, a system is a logical set configuration of a plurality of apparatuses and is not limited to the configuration in which the apparatuses are provided in the same housing.

Advantageous Effects of Invention

In accordance with the configuration of an embodiment of the present disclosure, an apparatus and a method that perform a process of improving the quality of a low-quality image, such as a far-infrared image, are achieved.

Specifically, for example, the apparatus includes an image correction unit that repeatedly performs an image correction process using a plurality of processing units in at least two stages. The image correction unit inputs a low-quality image which is an image to be corrected and a high-quality image which is a reference image. Each of the processing units in each stage performs a correction process for the low-quality image, using a class correspondence correction coefficient corresponding to a feature amount extracted from a degraded image of the high-quality image. A processing unit in a previous stage performs the correction process, using a class correspondence correction coefficient corresponding to a feature amount extracted from an image having a higher degradation level than that in a processing unit in a subsequent stage. The class correspondence correction coefficient is generated by a learning process.

An apparatus and a method that perform a process of improving the quality of a low-quality image, such as a far-infrared image, are achieved by these processes.

It should be noted that the effects described in the specification are just illustrative and are not limited and additional effects may be obtained.

BRIEF DESCRIPTION OF DRAWINGS

FIG. 20 is a diagram illustrating an example of the installation position of an out-of-vehicle information detection unit and an imaging unit.

MODE(S) FOR CARRYING OUT THE INVENTION

Figure 1:
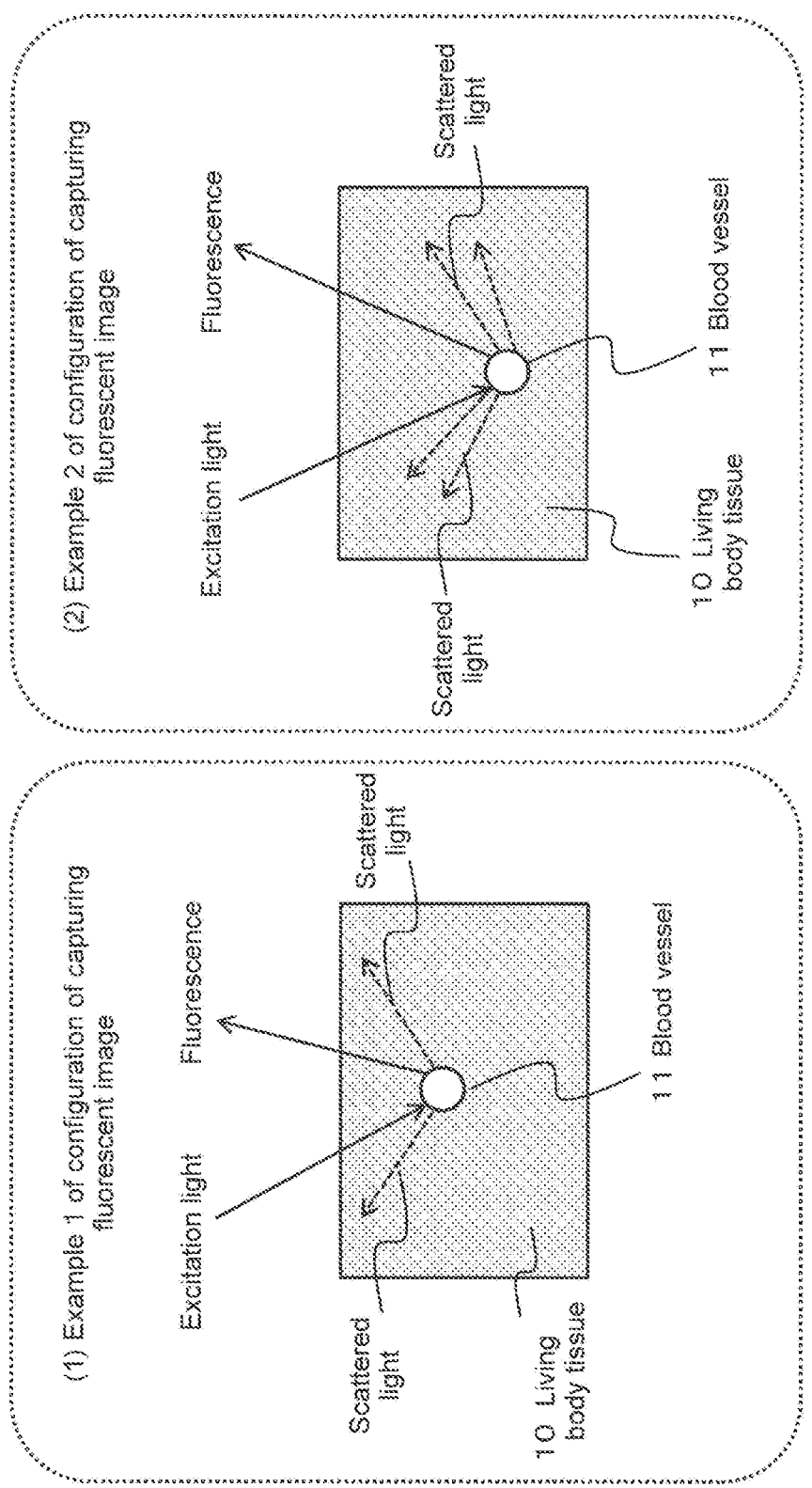
FIG. 1 is a diagram illustrating a fluorescent image.

Hereinafter, an image processing apparatus, an image processing method, and a program according to the present disclosure will be described in detail with reference to the drawings. It should be noted that the description will be made in accordance with the following items:

1. For Configuration and Process of Image Processing Apparatus According to Present Disclosure 2. For Example of Configuration of Image Processing Apparatus Performing Process of Improving Quality of Low-quality Image 3. For Example of Configuration and Process of Image Correction Unit 4. For Calculation of Class Correspondence Correction Coefficient by Learning Process and Storage of Class Correspondence Correction Coefficient in Storage Unit 5. For Image Correction Process Using Class Correspondence Correction Coefficient Calculated by Learning Process 6. For Other Embodiments 6-1. For Example of Feature Amounts Usable For Image Correction Process 6-2. For Other Examples of Multi-stage Configuration of Image Correction Unit 7. For Sequence of Process Performed by Image Processing Apparatus 8. For Example of Hardware Configuration of Image Processing Apparatus 9. For Application Examples of Image Processing Apparatus According to Present Disclosure 10. Summary of Configuration of Present Disclosure 1. FOR CONFIGURATION AND PROCESS OF IMAGE PROCESSING APPARATUS ACCORDING TO PRESENT DISCLOSURE The configuration and process of an image processing apparatus according to the present disclosure will be described with reference to FIG. 1 and the subsequent figures.

First, an image to be processed by the image processing apparatus according to the present disclosure will be described with reference to FIG. 1 and the subsequent figures.

The image processing apparatus according to the present disclosure performs a quality improvement process of performing image processing for a low-quality image, such as a far-infrared image or a fluorescent image having a lower resolution than a general visible image, to improve the quality of the image.

Specifically, the image processing apparatus performs a quality improvement process of performing image processing for a combination of a low-quality image, such as a far-infrared image or a fluorescent image, and a visible image which is a high-quality image having the same object as the low-quality image to improve the quality of the far-infrared image or the fluorescent image.

Hereinafter, the fluorescent image and the far-infrared image which are low-quality images to be subjected to the quality improvement process will be described.

First, the fluorescent image will be described.

As described above, the use of a fluorescent image different from a visible image in addition to the visible image which is a general color image is increasing in an endoscope that captures the image of the inside of a living body.

The fluorescent image is an image obtained by emitting excitation light with a specific wavelength and capturing fluorescence included in light reflected from a substance in the living body.

The fluorescent image can express, for example, a difference in intensity according to a lesion in the living body and the use of the fluorescent image makes it possible to effectively analyze the progress of a disease.

An example of the configuration of capturing the fluorescent image will be described with reference to FIG. 1.

The fluorescent image is an image obtained by emitting excitation light with a specific wavelength, inputting fluorescence which has been output from a living body tissue, such as a blood vessel, to an imaging element, and capturing the fluorescence.

FIG. 1(1) illustrates an example of the configuration of capturing an image of a blood vessel 11 in a relatively shallow portion of a living body tissue 10 and FIG. 1(2) illustrates an example of the configuration of capturing an image of the blood vessel 11 in a relatively deep portion of the living body tissue 10.

In a case in which the blood vessel is irradiated with excitation light, a plurality of scattered light components are generated. In particular, in the deep portion of the living body tissue 10, a larger amount of scattered light is generated. As a result, the quality of the fluorescent image captured by the imaging element is degraded.

Next, a far-infrared image will be described with reference to FIG. 2.

Figure 2:
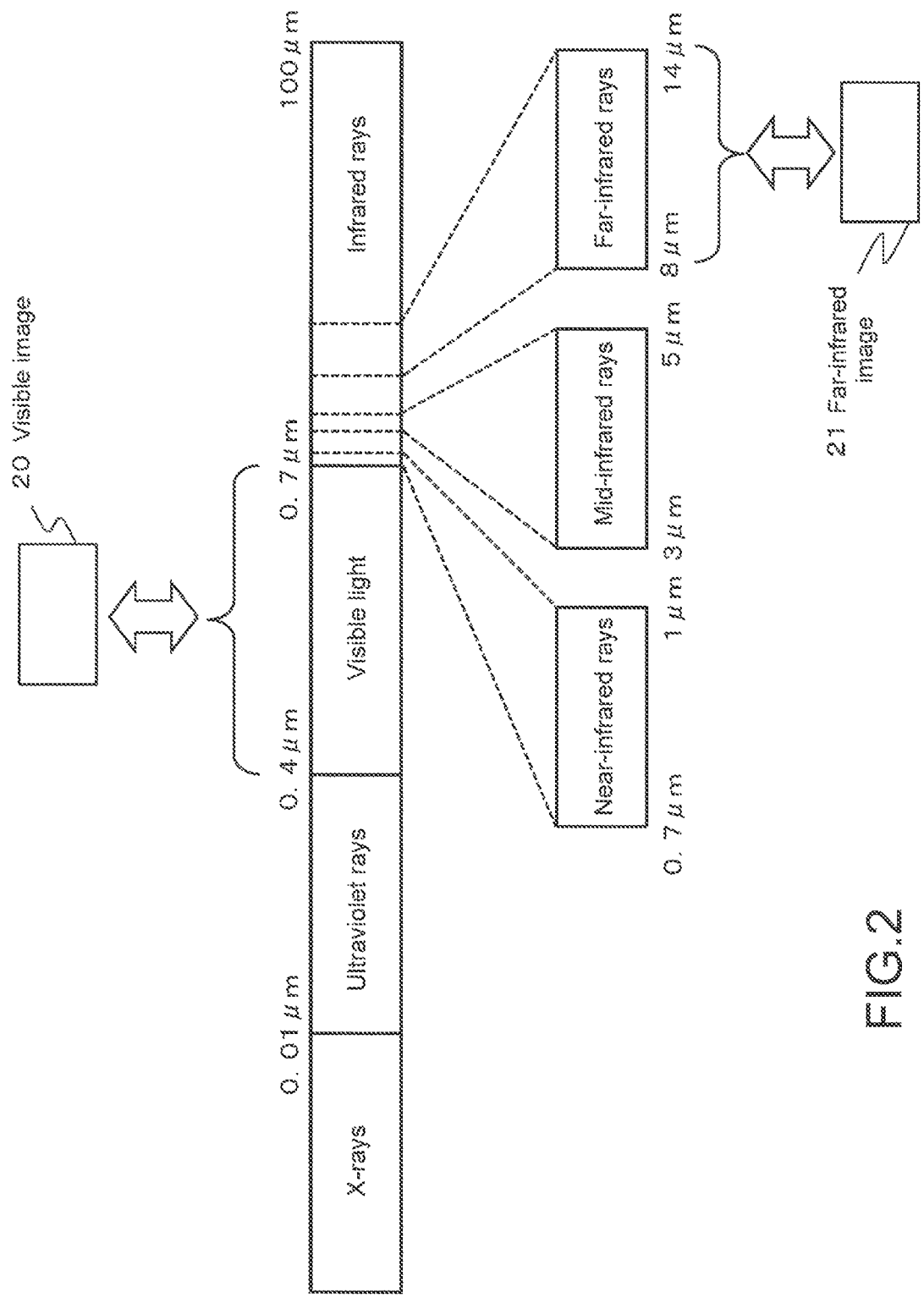
FIG. 2 is a diagram illustrating a correspondence relationship between the type of captured image and the wavelength of light.

As illustrated in FIG. 2, a visible image 20 is an image in a wavelength range of about 0.4 μm to 0.7 μm and is a color image such as an RGB image captured by a general camera.

In contrast, the far-infrared image is an image formed by long-wavelength light with a wavelength of 0.7 μm or more. An infrared imaging camera that captures infrared images can capture, for example, an image of a person that generates heat in the dark and is used as, for example, a surveillance camera.

It should be noted that infrared rays are divided into near-infrared rays with a wavelength of about 0.7 μm to 1 μm, mid-infrared rays with a wavelength of about 3 μm to 5 μm, and far-infrared rays with a wavelength of about 8 μm to 14 μm as illustrated in FIG. 2.

Among these images, a far-infrared image 21 obtained by mainly capturing far-infrared rays with a wavelength of about 8 μm to 14 μm is an image based on far-infrared rays with a longer wavelength and there is a problem that the resolution of the far-infrared image 21 is significantly reduced.

Figure 3:
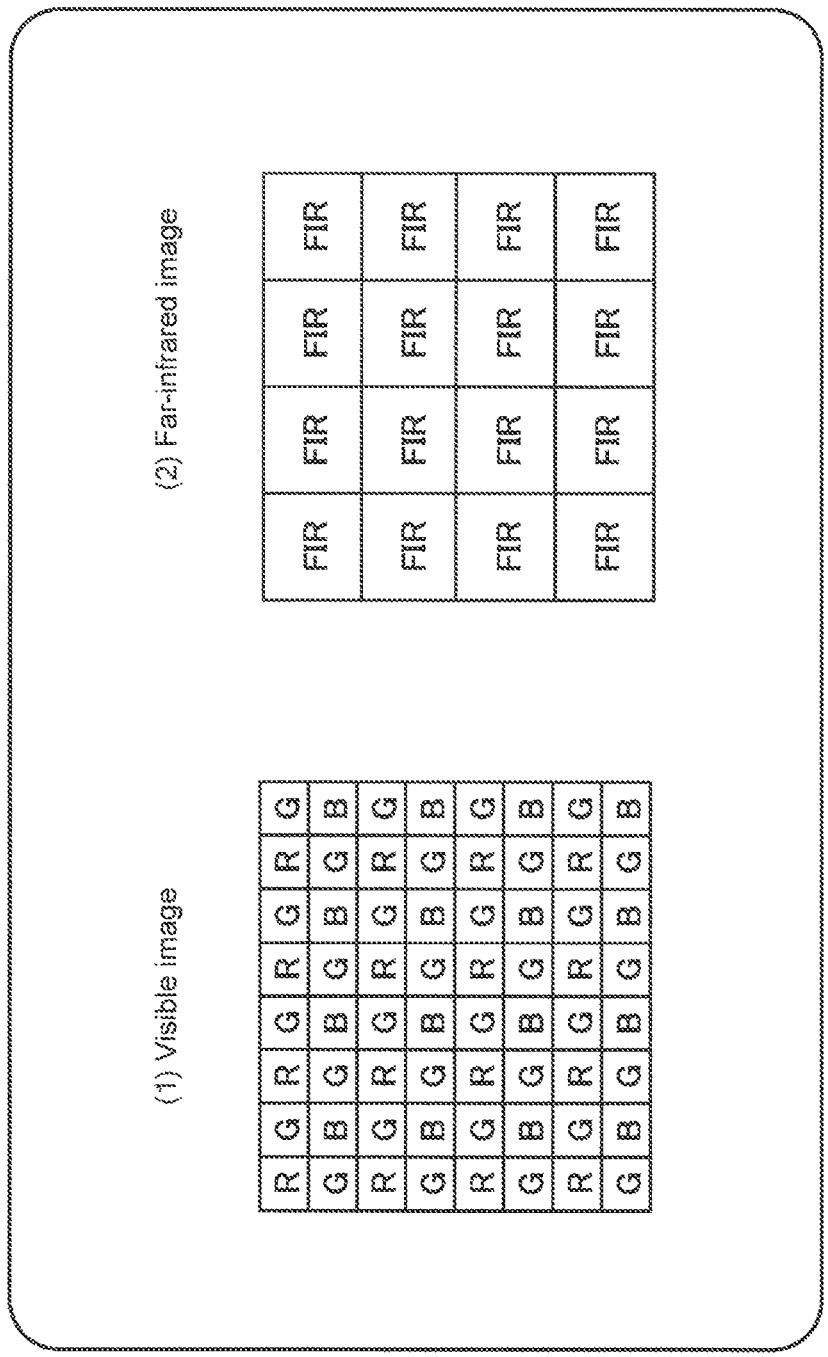
FIG. 3 is a diagram illustrating an example of the arrangement of pixels in a visible image and an infrared image.

FIG. 3 is a diagram illustrating an example of the arrangement of pixels on an imaging element that captures the visible image 20 and the far-infrared image 21.

The visible image illustrated in FIG. 3(1) shows an example of a Bayer array of R, G, and B pixels. The Bayer array is used for imaging elements of many visible imaging cameras.

Each pixel of the imaging element outputs an electric signal corresponding to the amount of light with R, G, or B wavelengths.

In contrast, the far-infrared image illustrated in FIG. 3(2) is obtained by capturing light with a far-infrared (FIR) wavelength at all pixel positions.

However, as illustrated in FIG. 3(1) and FIG. 3(2), in general, a far-infrared imaging element has a lower resolution than a visible imaging element. The reason is that infrared rays, particularly, far-infrared rays have a long wavelength and it is difficult for an imaging element having a high-density pixel array to use the infrared rays.

Similarly to the far-infrared image, for the fluorescent image, it is difficult to acquire a high-resolution image.

The image processing apparatus according to the present disclosure generates a high-quality image, using an image correction process of improving the quality of a low-quality image such as the far-infrared image or the fluorescent image.

Specifically, the image processing apparatus performs a quality improvement process of performing image processing for a combination of a low-quality image, such as a far-infrared image or a fluorescent image, and a visible image which is a high-quality image having the same object as the low-quality image to improve the quality of the low-quality image such as the far-infrared image or the fluorescent image.

It should be noted that the quality improvement process according to the present disclosure can be applied not only to the far-infrared image or the fluorescent image, but also to other low-quality images.

2. FOR EXAMPLE OF CONFIGURATION OF IMAGE PROCESSING APPARATUS PERFORMING PROCESS OF IMPROVING QUALITY OF LOW-QUALITY IMAGE

Figure 4:
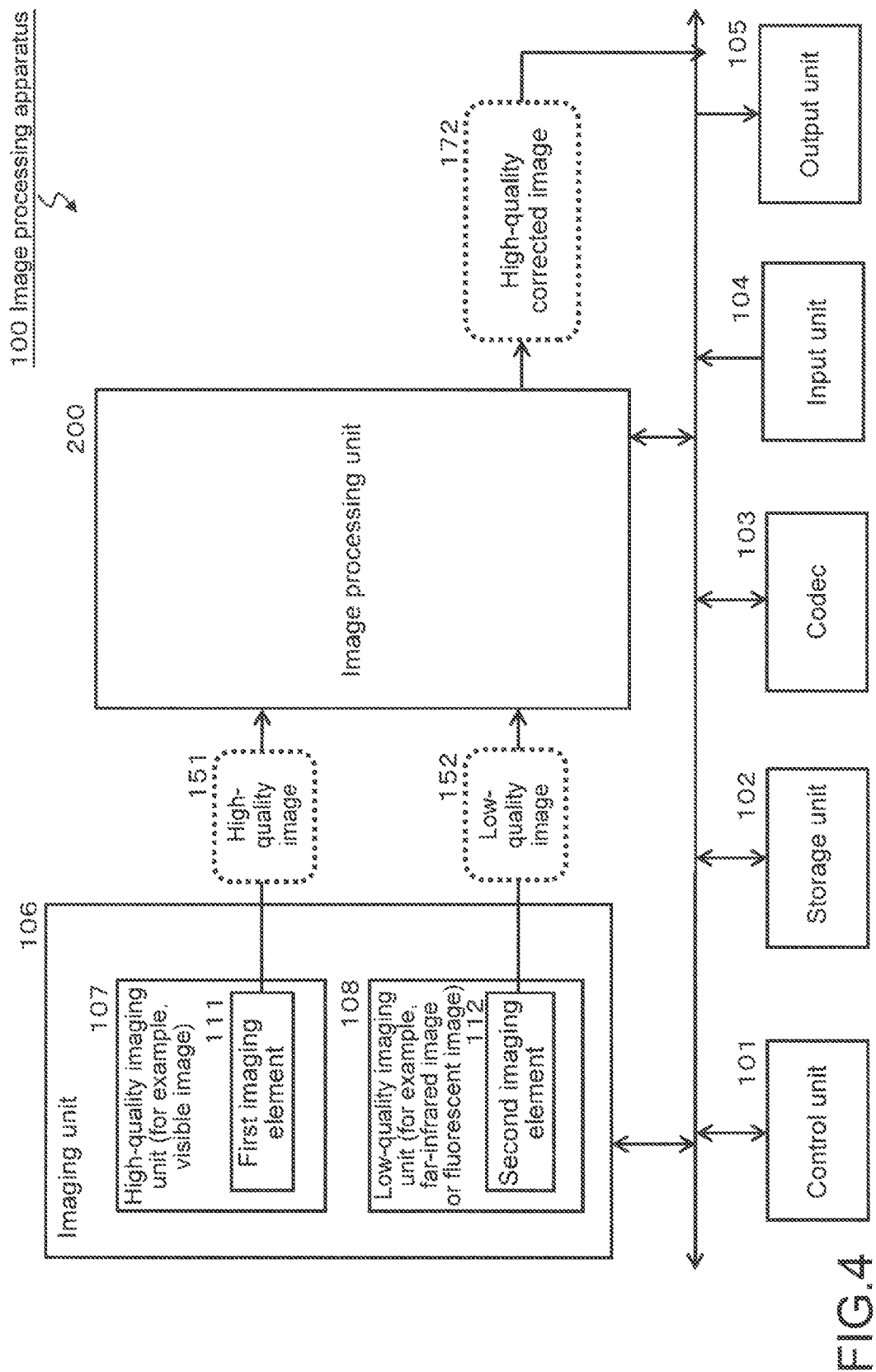
FIG. 4 is a diagram illustrating a process performed by an image processing apparatus according to the present disclosure.

FIG. 4 is a block diagram illustrating the configuration of an imaging apparatus which is an example of an image processing apparatus 100 according to the present disclosure.

It should be noted that the image processing apparatus according to the present disclosure is not limited to the imaging apparatus and includes, for example, an information processing apparatus such as a PC that receives an image captured by the imaging apparatus and performs image processing.

Hereinafter, the configuration and process of the imaging apparatus as an example of the image processing apparatus 100 according to the present disclosure will be described.

Image processing other than an imaging process described in the following embodiments can be performed not only by the imaging apparatus, but also by the information processing apparatus such as a PC.

The image processing apparatus 100 as the imaging apparatus illustrated in FIG. 4 includes a control unit 101, a storage unit 102, a codec 103, an input unit 104, an output unit 105, an imaging unit 106, and an image processing unit 120.

The imaging unit 106 includes a high-quality imaging unit 107 that captures a high-quality image with high resolution, such as a general visible image, and a low-quality imaging unit 108 that captures a low-quality image with low resolution, such as a far-infrared image or a fluorescent image.

The high-quality imaging unit 107 includes a first imaging element 111 that captures, for example, a visible image with high resolution. The first imaging element 111 includes, for example, R, G and B pixels that are arranged in the Bayer array described with reference to FIG. 2(1) and each pixel outputs a signal corresponding to input light of each of R, G, and B.

In contrast, the low-quality imaging unit 108 includes a second imaging element 112 that captures a low-quality image with low resolution such as a far-infrared image or a fluorescent image. The second imaging element 112 captures, for example, a far-infrared image or a fluorescent image and can capture only an image with a lower quality than the first imaging element 111.

A high-quality image 151 which is an image captured by the high-quality imaging unit 107 and a low-quality image 152 which is an image captured by the low-quality imaging unit 108 are input to the image processing unit 200.

The image processing unit 200 performs a process of improving the quality of the low-quality image 152, that is, a quality improvement process, using the two images.

The image processing unit 200 generates a high-quality corrected image 172 and outputs the high-quality corrected image 172 as the processing result.

The high-quality corrected image 172 is a high-quality far-infrared image or a high-quality fluorescent image generated by performing a correction process for the low-quality image such as the far-infrared image or the fluorescent image captured by the low-quality imaging unit 108.

The high-quality imaging unit 107 and the low-quality imaging unit 108 are two imaging units set at positions that are a predetermined distance away from each other and capture images from different viewpoints.

The same object image is not captured by the corresponding pixels, that is, the pixels at the same position in two images captured from different viewpoints and object deviation corresponding to disparity occurs.

In a case in which the captured images are still images, each of the high-quality imaging unit 107 and the low-quality imaging unit 108 captures one still image. That is, a total of two still images are captured. In a case in which a moving image is captured, each of the imaging units captures continuous image frames.

It should be noted that the control unit 101 controls the imaging timing of the imaging units.

The control unit 101 controls various processes of the imaging apparatus 100, such as an imaging process, signal processing for a captured image, an image recording process, and a display process. The control unit 101 includes, for example, a CPU that performs processes according to various processing programs stored in the storage unit 102 and functions as a data processing unit that executes programs.

The storage unit 102 is, for example, a RAM or a ROM that functions as a captured image storage unit, a storage unit storing processing programs executed by the control unit 101 or various parameters, and a work area at the time of data processing.

The codec 103 performs a coding and decoding process such as a process of compressing and decompressing a captured image.

The input unit 104 is, for example, a user operation unit and is used to input control information such as information related to the start and end of imaging and the setting of various modes.

For example, the output unit 105 includes a display unit and a speaker and is used to display captured images and through images and to output voice.

The image processing unit 120 receives two images input from the imaging unit 106 and performs a process of improving the quality of the input images using the two images.

Specifically, the image processing unit 120 performs the process of improving the quality of the low-quality image 152, such as a far-infrared image or a fluorescent image, captured by the low-quality imaging unit 108 to generate the high-quality corrected image 172 and outputs the high-quality corrected image 172.

As described above, the high-quality corrected image 172 is a high-quality far-infrared image or a high-quality fluorescent image generated by a correction process for a low-quality image, such as a far-infrared image or a fluorescent image, captured by the low-quality imaging unit 108.

The configuration and process of the image processing unit 120 will be described with reference to FIG. 5 and the subsequent figures.

In this embodiment, the image processing unit 120 receives two types of images, that is, the high-quality image 151 captured by the high-quality imaging unit 107 and the low-quality image 152 captured by the low-quality imaging unit 108 and performs the process of improving the quality of the low-quality image 152 with the two types of images to generate the high-quality corrected image 172.

The process performed by the image processing unit 120 will be described.

In the image processing unit 120, the low-quality image 152 captured by the low-quality imaging unit 108 is input to a scaler 121 and the scaler 121 performs a scaling process of making the size of the low-quality image 152 equal to the size of the high-quality image 151.

This is an image size adjustment process for removing the difference between the size of the first imaging element 111 of the low-quality imaging unit 108 and the size of the second imaging element of the high-quality imaging unit 107.

In many cases, the size of the first imaging element 111 of the low-quality imaging unit 108 is less than the size of the second imaging element of the high-quality imaging unit 107.

The scaler 121 performs a scaling process of making the size of the low-quality image 152 equal to the size of the high-quality image 151.

The high-quality image 151 and the low-quality image 152 having the same size are input to a disparity amount and movement detection unit 122 and an image positioning unit 123.

The disparity amount and movement detection unit 122 detects the amount of disparity between the high-quality image 151 and the low-quality image 152 and the amount of movement between the two images.

The low-quality imaging unit 108 and the high-quality imaging unit 107 are two imaging units set at the positions that are a predetermined distance away from each other and capture images (the high-quality image 151 and the low-quality image 152) from different viewpoints.

The same object image is not captured by the corresponding pixels, that is, the pixels at the same position in two images captured from different viewpoints, that is, the high-quality image 151 and the low-quality image 152 and object deviation corresponding to disparity occurs.

In addition, the two images are not captured at the exactly same timing. In a case in which the objects include a moving object, the positions of the same object in the two images are different from each other. That is, the amount of movement of the object exists.

The disparity amount and movement detection unit 122 detects the amount of disparity between the high-quality image 151 and the low-quality image 152 and the amount of movement between the two images and inputs information thereof, that is, disparity information and movement information, for example, a motion vector (MV) to the image positioning unit 123.

The image positioning unit 123 performs a positioning process for the high-quality image 151 and the low-quality image 152 subjected to size adjustment, using the disparity information and the movement information input from the disparity amount and movement detection unit 122.

That is, the image positioning unit 123 performs the positioning process for the two images such that the same object is located at the same position of each image.

It should be noted that, specifically, the image positioning unit 123 performs a positioning process of setting, for example, the high-quality image 151 to a reference position and aligning an object position of the low-quality image 152 with an object position of the high-quality image 151, without moving the object position of the high-quality image 151.

However, the image to be used as the reference image is not particularly limited and any image may be used as the reference image.

Figure 5:
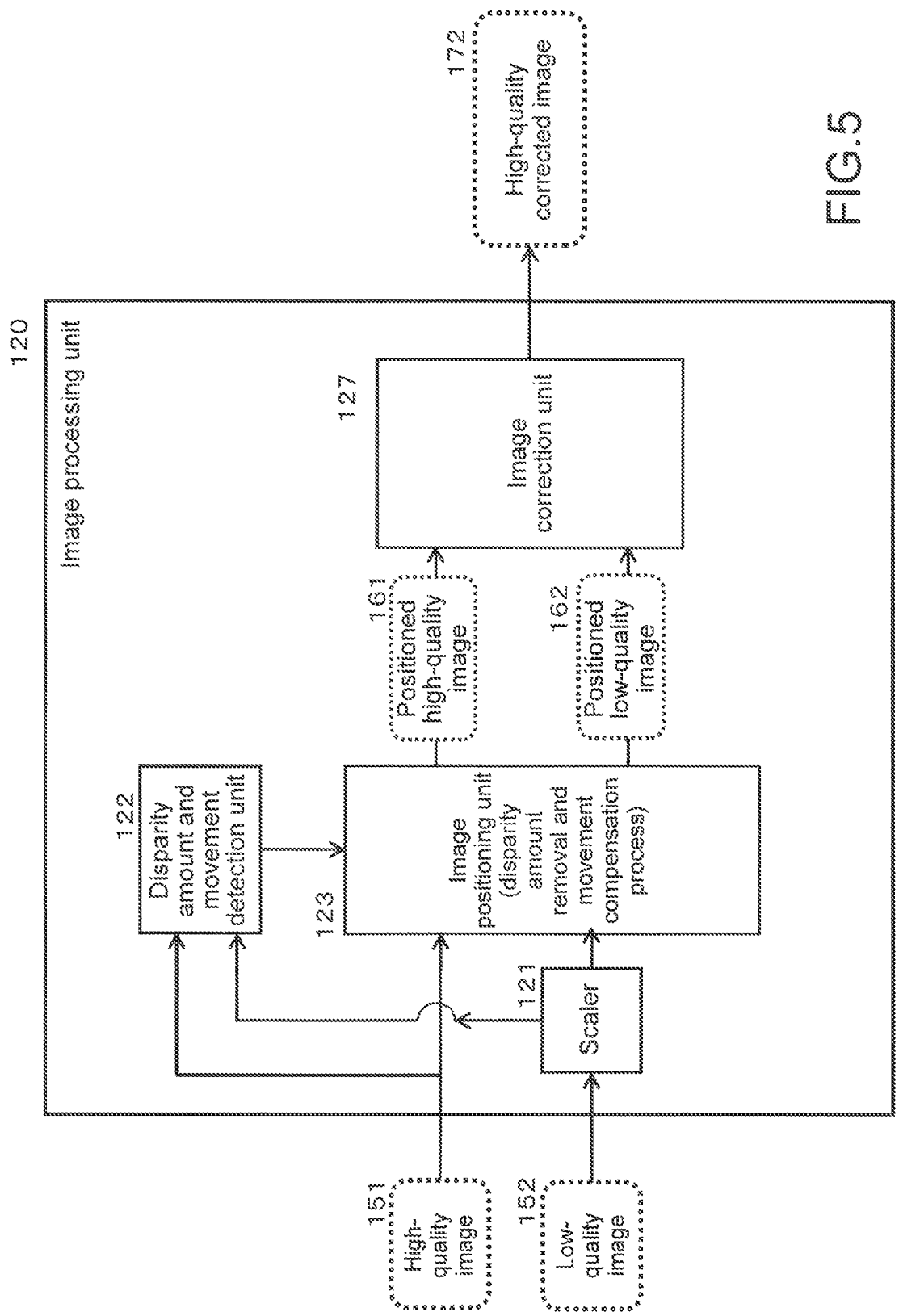
FIG. 5 is a diagram illustrating the configuration and process of an image processing unit.

The image positioning unit 123 outputs the positioned two images, that is, a positioned high-quality image 161 and a positioned low-quality image 162 illustrated in FIG. 5 to an image correction unit 127.

The image correction unit 127 receives the positioned high-quality image 161 and the positioned low-quality image 162 and performs a process of improving the quality of the positioned low-quality image 162.

3. FOR EXAMPLE OF CONFIGURATION AND PROCESS OF IMAGE CORRECTION UNIT

Next, a specific example of the configuration and process of the image correction unit 127 in the image processing unit 120 illustrated in FIG. 5 will be described with reference to FIG. 6.

Figure 6:
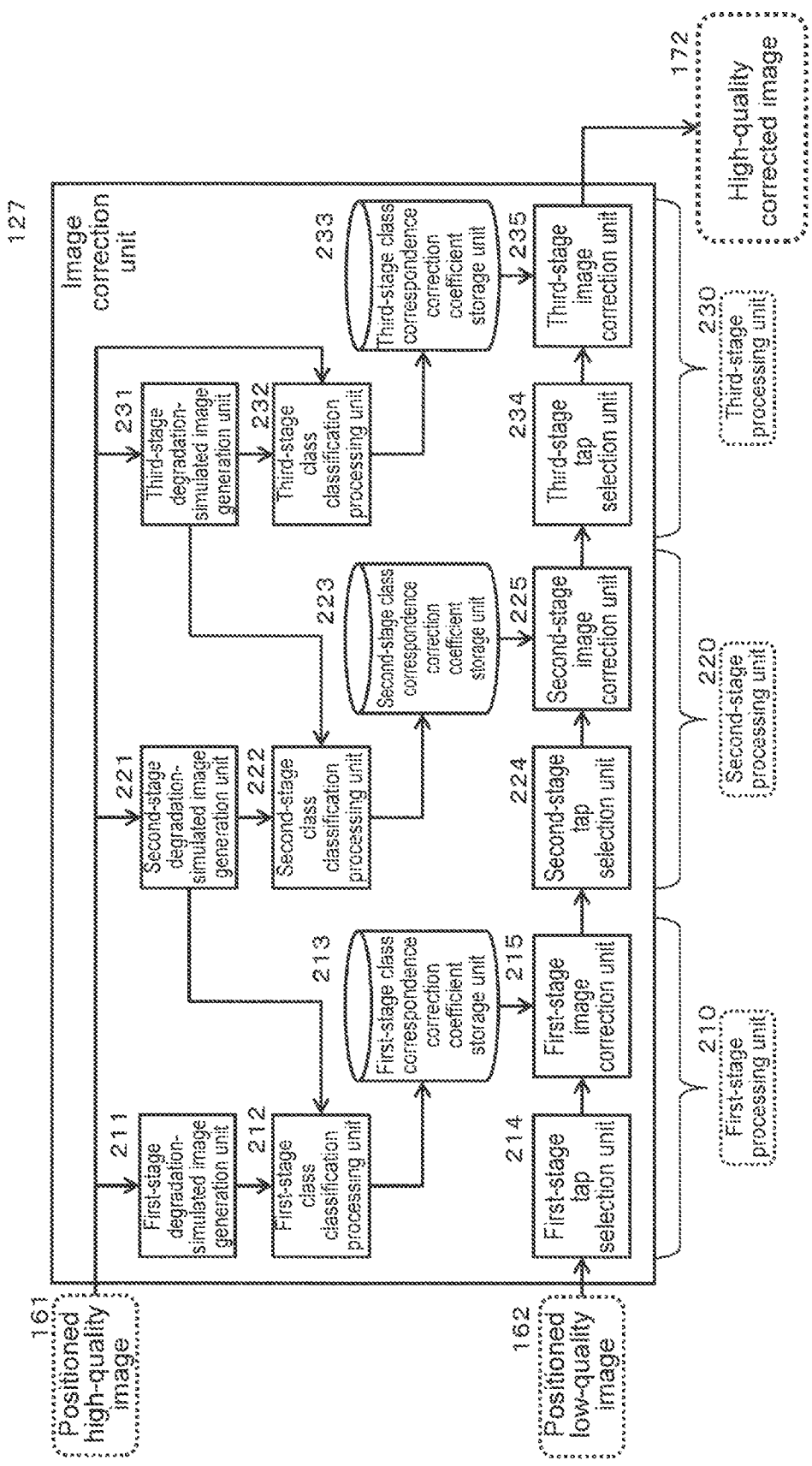
FIG. 6 is a diagram illustrating the configuration and process of an image correction unit.

The image correction unit 127 illustrated in FIG. 6 has a multi-stage (cascade) configuration having the following three-stage processing units:

A first-stage processing unit 210;
A second-stage processing unit 220; and
A third-stage processing unit 230.

The three processing units have the same components and include the following elements:

Degradation-simulated image generation units 211, 221, and 231;
Class classification processing units 212, 222, and 232;
Class correspondence correction coefficient storage units 213, 223, and 233;
Tap selection units 214, 224, and 234; and
Image correction units 215, 225, and 235.

First, the outline of each of the components will be described and a specific process of each component will be described in detail below.

The positioned high-quality image 161 is input to the degradation-simulated image generation units 211, 221, and 231 and the degradation-simulated image generation units 211, 221, and 231 generate simulated images with different degradation levels.

For example, the degradation-simulated image generation units 211, 221, and 231 a perform pixel value conversion process using a plurality of different low-pass filters (LPFs) for the positioned high-quality image 161 to generate the simulated images with different degradation levels.

The class classification processing units 212, 222, and 232 perform a class classification process for each pixel region of the degradation-level simulated images with each degradation level on the basis of the feature amount of each predetermined pixel region (each local region) of the degradation-simulated images.

The class classification process is a process of classifying classes for determining correction coefficients (correction parameters) used in the correction process performed by the image correction units 215, 225, and 235 in each stage.

It should be noted that the correction coefficients (correction parameters) corresponding to each class are stored in the class correspondence correction coefficient storage units 213, 223, and 233 in advance.

For example, the correction coefficients (correction parameters) calculated by a learning process using a sample image are stored in the class correspondence correction coefficient storage units 213, 223, and 233 in advance so as to be associated with each class. This learning process will be described below.

The correction coefficients (correction parameters) corresponding to the class decided by the class classification processing units 212, 222, and 232, that is, the class corresponding to a predetermined pixel region of each of the degraded images generated by the degraded image generation units 212, 222, and 232 are output from the class correspondence correction coefficient storage units 213, 223, and 233 to the image correction units 215, 225, and 235. The image correction units 215, 225, and 235 correct the pixel value of the positioned low-quality image 162, using the class correspondence correction coefficients.

It should be noted that, first, the positioned low-quality image 162 is input to the tap selection units 214, 224, and 234 before it is corrected by the image correction units 215, 225, and 235 and the tap selection units 214, 224, and 234 perform a tap selection process. Specifically, a process is performed which determines the position of a reference pixel applied to decide a correction pixel value of a pixel to be corrected, that is, a reference pixel in the vicinity of the position of the pixel to be corrected.

The image correction units 215, 225, and 235 decide the value of each pixel of the positioned low-quality image 162, using the pixel values of the taps (reference pixels) decided by the tap selection units 214, 224, and 234 and the class correspondence correction coefficients input from the class correspondence correction coefficient storage units 213, 223, and 233.

As illustrated in FIG. 6, in the configuration according to the present disclosure, the correction of this pixel value is performed as a multi-stage process (cascade process).

In this case, the correction coefficient applied in the processing unit in each stage is a correction coefficient subjected to class classification in the learning process performed in advance and the correction coefficient can be set as an accurate correction coefficient corresponding to a larger number of classes.

For example, in the example illustrated in FIG. 6, three-stage correction processing units in the first to third stages are provided. In a case in which the number of classes associated with the correction coefficients in each stage is 1000 classes, in three-stage correction processes in the first to third stages, correction can be performed using different correction coefficients corresponding to 1000×1000× 1000=1000000000, that is, 1K×1K×1K=1G classes. As a result, accurate correction corresponding to finely classified image characteristics is achieved.

The image processing apparatus according to the present disclosure achieves optimal correction corresponding to the feature amount of each local region of the image using the above-mentioned process.

[4. For Calculation of Class Correspondence Correction Coefficient by Learning Process and Storage of Class Correspondence Correction Coefficient in Storage Unit]

Next, the calculation of the class correspondence correction coefficient by the learning process and the storage of the class correspondence correction coefficient in the storage unit will be described.

A class correspondence correction coefficient calculation process and a process of storing the calculated correction coefficients in the class correspondence correction coefficient storage units 213, 223, and 233 are performed by the learning process performed as pre-processing of the actual image correction process. This process will be described with reference to FIG. 7 and the subsequent figures.

Figure 7:
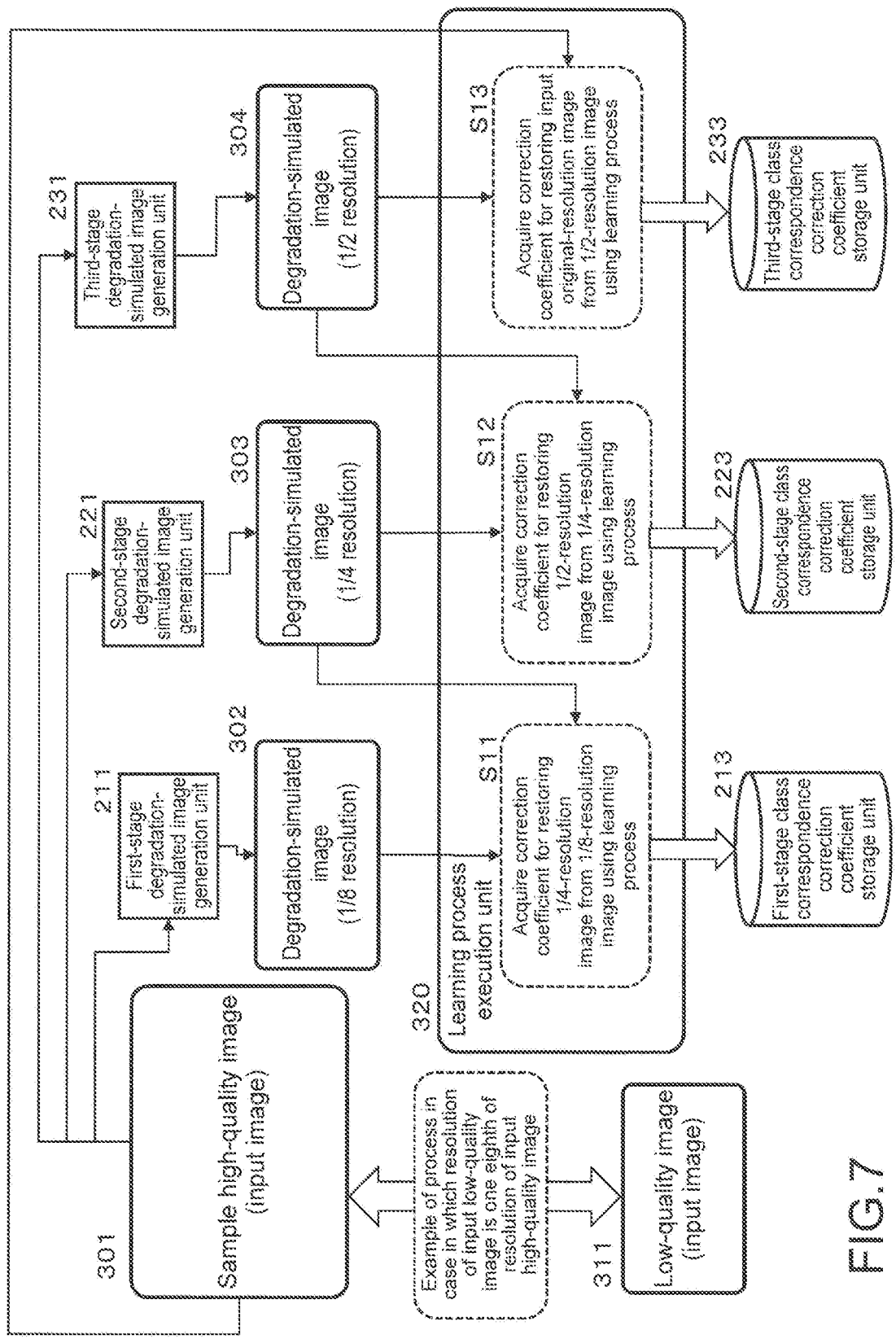
FIG. 7 is a diagram illustrating the execution configuration and process of a learning process of acquiring a feature amount from an image and calculating a correction coefficient.

FIG. 7 is a diagram illustrating an example of the process of calculating the class correspondence correction coefficients (parameters) to be stored in the class correspondence correction coefficient storage units 213, 223, and 233.

A sample high-quality image 301 is input.

It should be noted that, desirably, the number of sample high-quality images 301 to be input is not one, but two or more.

A large number of image data items having various characteristics are input as sample images and the learning process is performed.

That is, a large number of image data items having various characteristics are input, the learning process is performed, and correction coefficients (parameters) according to classes corresponding to different feature amounts generated as the result of learning are stored in the class correspondence correction coefficient storage units 213, 223, and 233.

The first-stage to third-stage degradation-simulated image generation units 211 to 231 illustrated in FIG. 7 generate images with the same degradation levels as the first-stage to third-stage degradation-simulated image generation units 211 to 231 of the image correction unit 127 illustrated in FIG. 6.

For example, the first-stage to third-stage degradation-simulated image generation units 211 to 231 apply an LPF to generate degraded images.

Here, an example of a process in a case in which a low-quality image which is the image to be corrected and is input to the image correction unit 127 in the actual image correction process is an image having a resolution that is one eighth of the resolution of a high-quality image input to the image correction unit 127 will be described.

In this case, the first-stage degradation-simulated image generation unit 211 generates a ⅛-resolution degradation-simulated image 302 having a resolution that is one eighth of the resolution of the sample high-quality image 301.

That is, the first-stage degradation-simulated image generation unit 211 generates a degraded image with a resolution level that is substantially equal to the resolution level of the low-quality image which is the image to be corrected and is input to the image correction unit 127 in the actual image correction process.

The second-stage degradation-simulated image generation unit 221 generates a ¼-resolution degradation-simulated image 303 having a resolution that is a quarter of the resolution of the sample high-quality image 301.

In addition, the third-stage degradation-simulated image generation unit 231 generates a ½-resolution degradation-simulated image 304 having a resolution that is half the resolution of the sample high-quality image 301.

As such, in the first to third stages, the images whose degradation levels are sequentially reduced are generated.

The learning process execution unit 320 performs the learning process of calculating the class correspondence correction coefficient (parameter) using these images.

The learning process execution unit 320 performs a process in Steps S11 to S13 illustrated in FIG. 7.

It should be noted that the process in Steps S11 to S13 may be performed sequentially or in parallel.

In Step S11, the ⅛-resolution degradation-simulated image 302 and the ¼-resolution degradation-simulated image 303 are input, the image feature amount of each predetermined pixel region (local region) of each image is calculated, and a correction coefficient (correction parameter) corresponding to the image feature amount is calculated by the learning process.

That is, a supervised learning process using the ¼-resolution degradation-simulated image 303 as a teacher image (restored image) and the ⅛-resolution degradation-simulated image 302 as a student image is performed to acquire the optimum correction coefficients (correction parameters) corresponding to various feature amounts.

A specific example of the process will be described with reference to FIG. 8.

Figure 8:
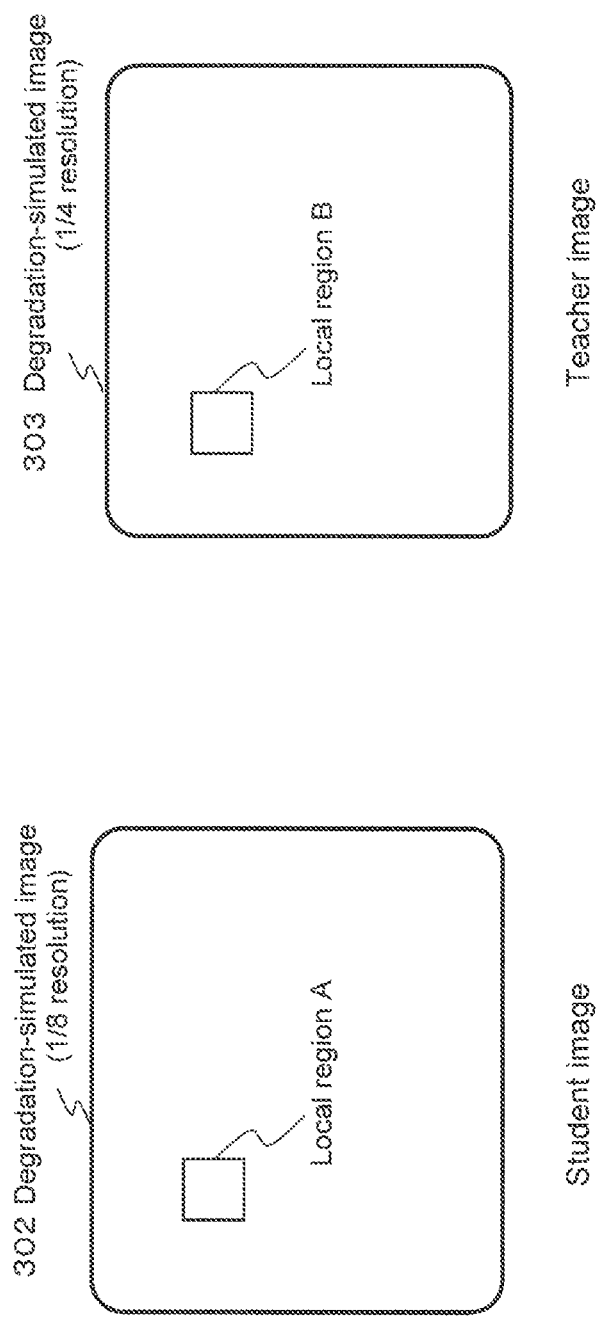
FIG. 8 is a diagram illustrating the execution configuration and process of the learning process of acquiring a feature amount from an image and calculating a correction coefficient.

As illustrated in FIG. 8, rectangular pixel regions (local regions A and B) that have, for example, several pixels to several tens of pixels and are at a corresponding pixel position which is the same coordinate position are extracted from the ⅛-resolution degradation-simulated image 302 which is a student image and the ¼-resolution degradation-simulated image 303 which is a teacher image (restored image) and the feature amount of the pixel region, for example, brightness distribution information is acquired.

In addition, a correction coefficient (correction parameter) for converting the value of a central pixel of the local region A of the ⅛-resolution degradation-simulated image 302 which is a student image into the value of a central pixel of the local region B of the ¼-resolution degradation-simulated image 303 which is a teacher image (restored image) is calculated.

The correction coefficient calculation process is performed for all of various sample images images.

The learning process using many sample images is performed to calculate the optimum correction coefficients corresponding to a large number of different feature amounts.

It should be noted that the correction coefficient (correction parameter) is calculated for each class corresponding to the classification information of the feature amount.

The correction coefficients corresponding to each class are stored in the first-stage class correspondence correction coefficient storage unit 213.

It should be noted that various feature amounts can be applied as the feature amounts of each region of the image.

For example, this will be described with reference to FIG. 9. In the example illustrated in FIG. 9, a pixel value (brightness) distribution of each region (each local region) of the image is used as the feature amount.

Figure 9:
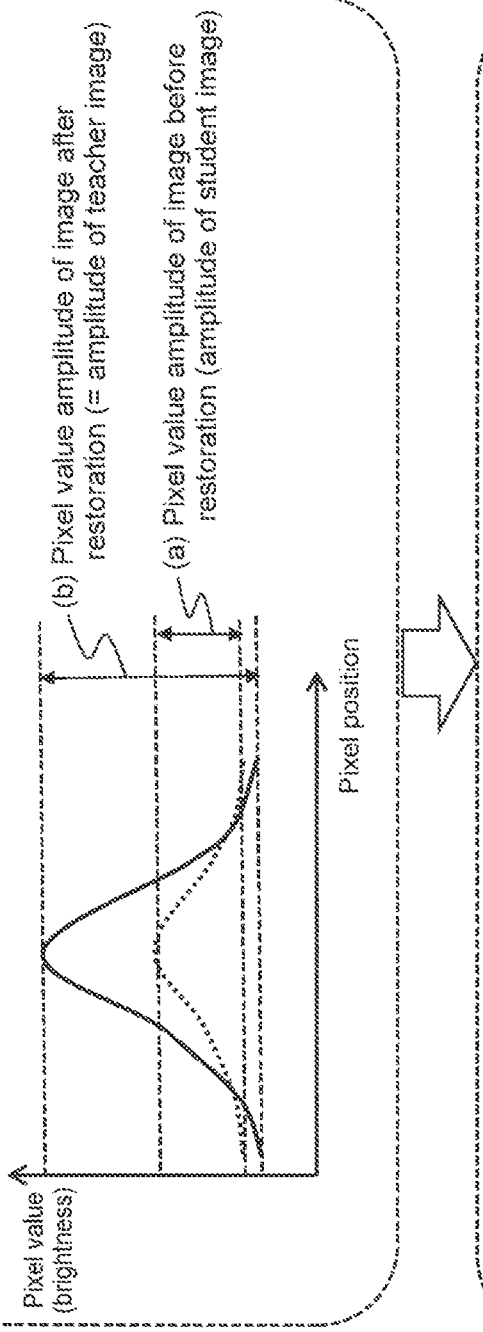
FIG. 9 is a diagram illustrating a feature amount acquired from an image, a correction coefficient, and a class classification process.
Figure 9:
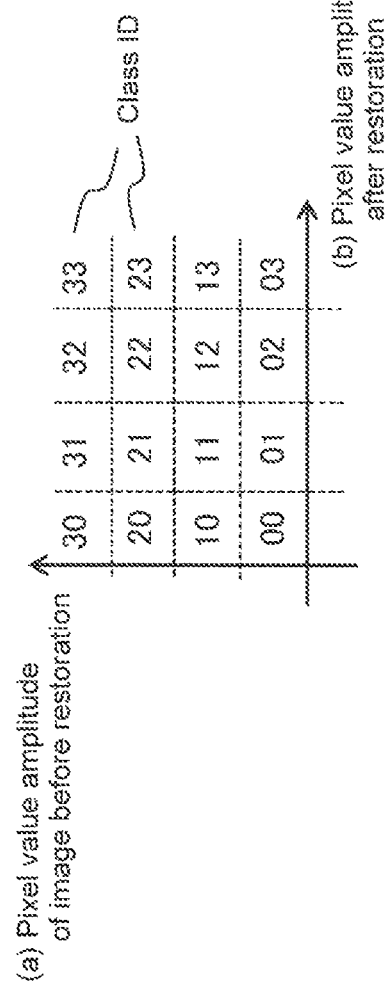

FIG. 9(1) illustrates an example of the pixel value distribution of the image before and after restoration.

In a graph illustrated in FIG. 9(1), a solid line indicates the pixel value distribution of the local region of the image after restoration, that is, the ¼-resolution degradation-simulated image 303 which is a teacher image.

In contrast, in the graph illustrated in FIG. 9(1), a dotted line indicates the pixel value distribution of the local region of the image before restoration, that is, the ⅛-resolution degradation-simulated image 302 which is a student image.

The pixel value distribution of the local region of the ⅛-resolution degradation-simulated image 302 which is a student image is gentler than the pixel value distribution of the local region of the ¼-resolution degradation-simulated image 303 which is a teacher image. That is, pixel value distribution of the local region of the 1 the ⅛-resolution degradation-simulated image 302 is unclear.

As illustrated in FIG. 9(1), the amplitudes of the two images are clearly different from each other.

FIG. 9(1) illustrates the following two amplitudes:

(a) A pixel value amplitude of the image before restoration (=the amplitude of the student image); and (b) A pixel value amplitude of the image after restoration (=the amplitude of the teacher image).

For example, class classification is performed on the basis of a combination of the data items in (a) and (b).

FIG. 9(2) is a diagram illustrating an example of the class classification.

The diagram illustrated in FIG. 9(2) shows an example in which (b) the pixel value amplitude of the image after restoration (=the amplitude of the teacher image) is set to the horizontal axis and (a) the pixel value amplitude of the image before restoration (=the amplitude of the student image) is set to the vertical axis and a class ID (identifier) is set to each predetermined classified region.

For example, as such, class classification is performed on the basis of the feature amount (the brightness distribution of the local region).

The learning processing unit 320 illustrated in FIG. 7 calculates a correction coefficient (correction parameter) for each class, that is, a correction coefficient (correction parameter) for converting the pixel value of each region (local region) of the ⅛-resolution degradation-simulated image 302 which is a student image into the pixel value of a corresponding position of the ¼-resolution degradation-simulated image 303 which is a teacher image (restored image) and stores the calculated correction coefficient as the correction coefficient (correction parameter) corresponding to each class (class ID) in the first-stage class correspondence correction coefficient storage unit 213.

Figure 10:
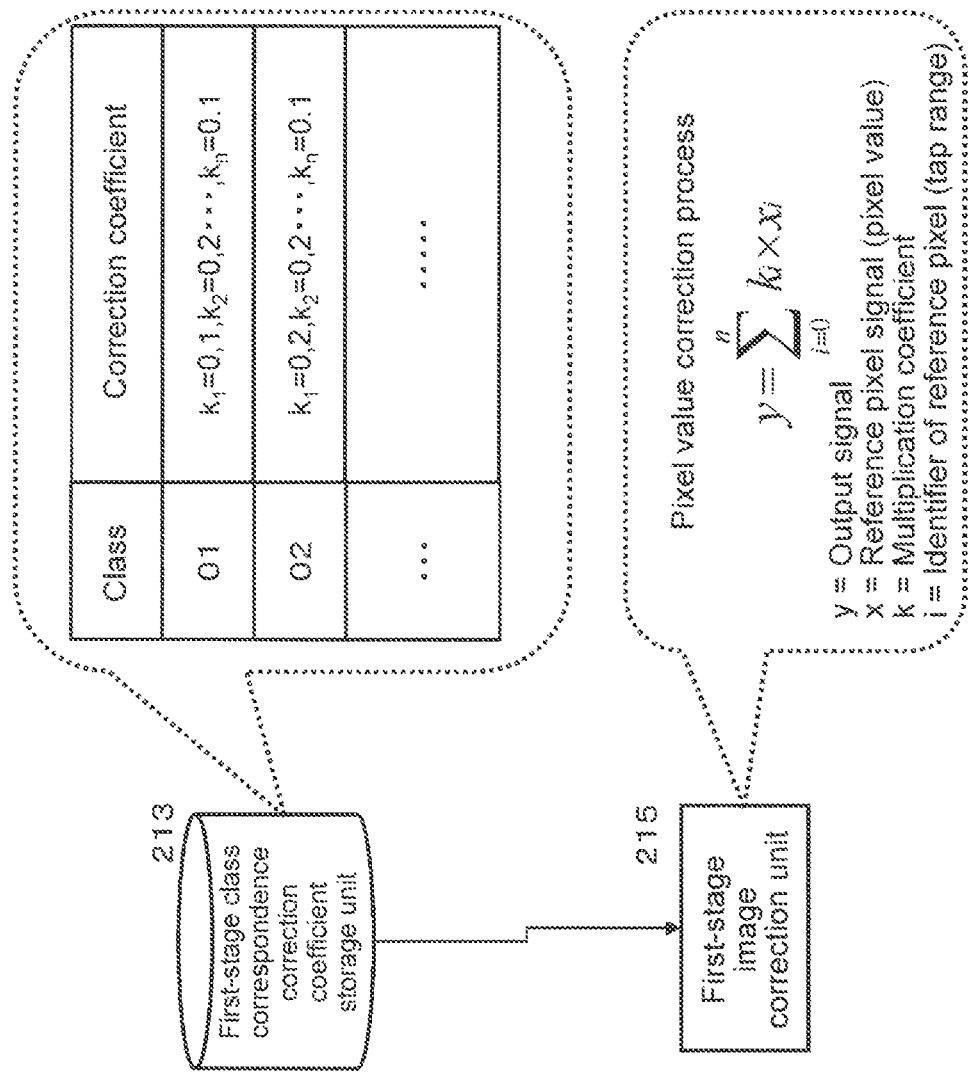
FIG. 10 is a diagram illustrating an example of a process of acquiring a feature amount from an image and performing a correction process using a correction coefficient subjected to class classification.

FIG. 10 is a diagram illustrating an example of the correction coefficients stored in the first-stage class correspondence correction coefficient storage unit 213.

The example of the correction coefficients stored in the first-stage class correspondence correction coefficient storage unit 213 illustrated in FIG. 10 is an example in a case in which the correction performed by the first-stage correction unit 215 of the image correction unit 127 illustrated in FIG. 6 is correction for calculating a corrected pixel value y in accordance with the following (Expression 1) as illustrated in FIG. 10.

[Math. 1]

(Expression 1)

$$y = \sum_{i=0}^{n} k_i \times x_i \qquad (\text{式 1})$$

It should be noted that each symbol in the above-mentioned (Expression 1) has the following meaning:

y: a correction value of the pixel to be corrected;
$x_i$: a value of the reference pixel;
i: an identifier of the reference pixel; and
$k_i$: a multiplication coefficient corresponding to the reference pixel i.

The correction coefficients stored in the first-stage class correspondence correction coefficient storage unit 213 illustrated in FIG. 10 are a set of the multiplication coefficients $k_i$ corresponding to the reference pixel i applied to the above-mentioned (Expression 1).

The set of the multiplication coefficients $k_i$ corresponding to the reference pixel i in (Expression 1) corresponds to, for example, the multiplication coefficients of the reference pixel set to the LPF.

That is, for example, the image correction unit in each processing stage performs the correction process using the LPF which multiplies the value of the reference pixel by the multiplication coefficient $k_i$ to calculate the correction value of the central pixel value to be corrected.

The multiplication coefficient $k_i$ is data that varies in accordance with the class corresponding to the feature amount.

The correction coefficient (ki) corresponding to the class is calculated by the learning process described with reference to FIGS. 7 to 9.

It should be noted that the position of the reference pixel $x_i$ in the above-mentioned (Expression 1) is decided in the tap selection units 214, 224, and 234 of the image correction unit 127 illustrated in FIG. 6.

As such, in Step S11, the learning processing unit 320 illustrated in FIG. 7 receives the ⅛-resolution degradation-simulated image 302 and the ¼-resolution degradation-simulated image 303 and detects the feature amount of each predetermined pixel region (local region) of each image. In addition, the learning process execution unit 320 calculates the correction coefficient corresponding to the class which corresponds to the optimum feature amount for restoring the ¼-resolution image from the ⅛-resolution image, using the learning process, and stores the correction coefficient in the first-stage class correspondence correction coefficient storage unit 213.

Similarly, in Step S12, the learning processing unit 320 illustrated in FIG. 7 receives the ¼-resolution degradation-simulated image 303 and the ½-resolution degradation-simulated image 304, calculates the correction coefficient corresponding to the class which corresponds to the optimum feature amount for restoring the ½-resolution image from the ¼-resolution image, using the learning process, and stores the correction coefficient in the second-stage class correspondence correction coefficient storage unit 223.

That is, in Step S12, the learning process execution unit 320 performs the learning process in which the ¼-resolution degradation-simulated image 303 is set as a student image and the ½-resolution degradation-simulated image 304 as a teacher image.

In the learning process, the feature amount of each predetermined pixel region (local region) of each image is detected. The optimum correction coefficient corresponding to the feature amount (=corresponding to the class) for restoring the ½-resolution image from the ¼-resolution image is calculated by the learning process and is stored in the second-stage class correspondence correction coefficient storage unit 223.

Similarly, in Step S13, the learning processing unit 320 illustrated in FIG. 7 receives the ½-resolution degradation-simulated image 304 and the original sample high-quality image 301, calculates the correction coefficient corresponding to the class which corresponds to the optimum feature amount for restoring the original sample high-quality image from the ½-resolution image, using the learning process, and stores the correction coefficient in the third-stage class correspondence correction coefficient storage unit 233.

That is, in Step S13, the learning process execution unit 320 performs the learning process in which the ½-resolution degradation-simulated image 304 is set as a student image and the original sample high-quality image 301 (=1/1 resolution) as a teacher image.

In the learning process, the feature amount of each predetermined pixel region (local region) of each image is detected. The optimum correction coefficient corresponding to the feature amount (corresponding to the class) for restoring an image having the resolution (1/1 resolution) of the original sample image 301 from the ½-resolution image is calculated by the learning process and is stored in the third-stage class correspondence correction coefficient storage unit 233.

With this configuration, the following correction coefficients are stored in the correction coefficient storage units 213, 223, and 233 of the image correction unit 127 illustrated in FIG. 6 by the learning process which is performed in advance using the input sample image:

(1) The first-stage class correspondence correction coefficient storage unit 213=the correction coefficient corresponding to the class which corresponds to the optimum feature amount for restoring the ¼-resolution image from the ⅛-resolution image;

(2) The second-stage class correspondence correction coefficient storage unit 223=the correction coefficient corresponding to the class which corresponds to the optimum feature amount for restoring the ½-resolution image from the ¼-resolution image; and (3) The third-stage class correspondence correction coefficient storage unit 233=the correction coefficient corresponding to the class which corresponds to the optimum feature amount for restoring the 1/1-resolution image from the ½-resolution image.

After the correction coefficients corresponding to the classes are stored by the learning process in advance, the actual image to be corrected, that is, the positioned low-quality image 162 illustrated in FIG. 6 and the positioning high-quality image 161 which is a high-quality image obtained by capturing the same image are input to the image correction unit 127 illustrated in FIG. 6 and the image correction unit 127 performs a correction process, that is, a quality improvement process for the positioned low-quality image 162.

[5. For Image Correction Process Using Class Correspondence Correction Coefficient Calculated by Learning Process]

Next, the image correction process using the class correspondence correction coefficients calculated by the learning process will be described.

In the image correction unit 127 illustrated in FIG. 6, the class correspondence correction coefficients calculated by the learning process are stored in the storage units, that is, the first-stage to third-stage class correspondence correction coefficient storage units 213 to 233.

As such, after the correction coefficients are stored in each storage unit, the positioned low-quality image 162 which is the actual image to be corrected and the positioned high-quality image 161 having the same object as the positioned low-quality image 162 are input.

It should be noted that, as described above, the positioned low-quality image 162 is a low-resolution image such as a fluorescent image or a far-infrared image.

In contrast, the positioned high-quality image 161 is a high-resolution image such as a visible image.

As described above, the image correction unit 127 illustrated in FIG. 6 has a multi-stage configuration of the first-stage processing unit 210, the second-stage processing unit 220, and the third-stage processing unit 230. The processing result of the first-stage processing unit 210 is input to the second-stage processing unit 220, the processing result of the second-stage processing unit 220 is input to the third-stage processing unit 230, and the processing result of the third-stage processing unit 230 is output as the processing result of the image correction unit 127.

For example, in a case in which the positioned low-quality image 162 which is the image to be corrected has a resolution that is one eighth of the resolution of the positioned high-quality image 161 which is the reference image, the processes performed in each processing stage are set as follows.

The first-stage processing unit 210 performs a quality improvement process of converting the ⅛-resolution positioned low-quality image 162 into a ¼-resolution image.

The second-stage processing unit 220 performs a quality improvement process of converting the ¼-resolution image input from the first-stage processing unit 210 into a ½-resolution image.

The third-stage processing unit 230 performs a quality improvement process of converting the ½-resolution image input from the second-stage processing unit 220 into a 1/1-resolution image.

The ⅛-resolution positioned low-quality image 162 which is the image to be corrected is output as a high-quality image having the same resolution as the positioned high-quality image 161 which is the reference image by the three-stage process.

A specific example of the process performed in the first-stage processing unit 210 of the image correction unit 127 illustrated in FIG. 6 will be described with reference to FIGS. 11 and 12.

Figure 11:
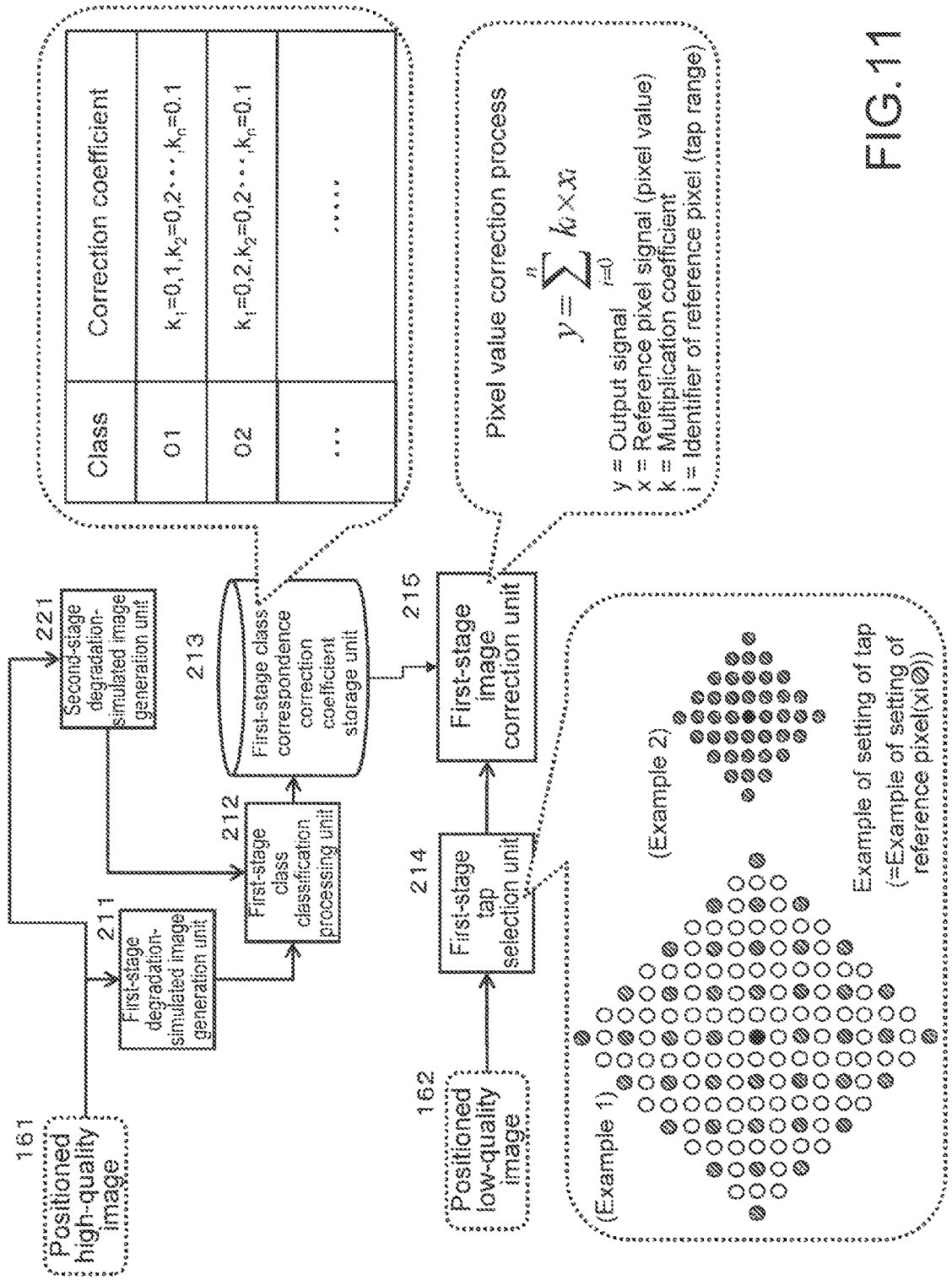
FIG. 11 is a diagram illustrating an example of the process of acquiring a feature amount from an image and performing a correction process using a correction coefficient subjected to class classification.

FIG. 11 illustrates the first-stage degradation-simulated image generation unit 211, the first-stage class classification processing unit 212, the first-stage class correspondence correction coefficient storage unit 213, the first-stage tap selection unit 214, and the first-stage image correction unit 215 which are components of the first-stage processing unit 210 and the second-stage degradation-simulated image generation unit 221 which is a component of the second-stage processing unit 210 in the image correction unit 127 illustrated in FIG. 6.

The positioned high-quality image 161 which is the reference image is input to the first-stage degradation-simulated image generation unit 211, the second-stage degradation-simulated image generation unit 221, and the third-stage degradation-simulated image generation unit 231 of the image correction unit 127 illustrated in FIG. 6 and is converted into low-resolution images with different levels by processes using different low-pass filters (LPFs).

The first-stage degradation-simulated image generation unit 211 generates a degradation-simulated image having a resolution that is one eighth of the resolution of the positioned high-quality image 161, that is, the same resolution as the positioned low-quality image 162 which is the image to be corrected.

The second-stage degradation-simulated image generation unit 221 generates a degradation-simulated image having a resolution that is a quarter of the resolution of the positioned high-quality image 161.

The third-stage degradation-simulated image generation unit 231 generates a degradation-simulated image having a resolution that is half the resolution of the positioned high-quality image 161.

The first-stage degradation-simulated image generation unit 211 illustrated in FIG. 11 inputs the degradation-simulated image having a resolution that is one eighth of the resolution of the positioned high-quality image 161 to the first-stage class classification processing unit 212.

In addition, the second-stage degradation-simulated image generation unit 221 illustrated in FIG. 11 inputs the degradation-simulated image having a resolution that is a quarter of the resolution of the positioned high-quality image 161 to the first-stage class classification processing unit 212.

The first-stage class classification processing unit 212 receives the two degradation-simulated images, detects the feature amount of each local region, and specifies a class corresponding to the detected feature amount.

The first-stage image correction unit 215 acquires a correction coefficient corresponding to the class specified by the first-stage class classification processing unit 212 from the first-stage class correspondence correction coefficient storage unit 213 and performs a process of correcting the pixel value of the positioned low-quality image 162.

It should be noted that the first-stage tap selection unit 214 performs a tap selection process as a process in a stage before the pixel value correction process of the first-stage image correction unit 215. The tap selection process is a process of selecting the reference pixel used to calculate the value of the pixel to be corrected.

For example, as illustrated in (Example 1) and (Example 2) in a lower part of FIG. 11, the reference pixel is selected from the pixels around one pixel to be corrected.

It should be noted that the setting that has been united in advance may be applied as the tap setting to all corrections or the tap setting may be changed in accordance with the class corresponding to the feature amount detected by the first-stage class classification processing unit 212.

In the example illustrated in FIG. 11, the correction performed by the first-stage image correction unit 215 is pixel value correction according to the above-mentioned (Expression 1). That is, the corrected pixel value y is calculated in accordance with the following (Expression 1).

[Math. 2]

(Expression 1)

$$y = \sum_{i=0}^{n} k_i \times x_i \quad (\text{式 1})$$

It should be noted that each symbol in the above-mentioned (Expression 1) has the following meaning:

y: a correction value of the pixel to be corrected;
$x_i$: a value of the reference pixel;
i: an identifier of the reference pixel; and
$k_i$: a multiplication coefficient corresponding to the reference pixel i.

Here, $k_i$ (the multiplication coefficient corresponding to the reference pixel i) that is used at this time is the correction coefficient corresponding to a specific class acquired from the first-stage class correspondence correction coefficient storage unit 213.

That is, the correction coefficient corresponding to the class which has been specified by the first-stage class classification processing unit 212 on the basis of the feature amounts of the local regions of the ⅛-resolution degradation-simulated image generated by the first-stage degradation-simulated image generation unit 211 and the ¼-resolution degradation-simulated image is used.

It should be noted that, for example, as described with reference to FIG. 9, a class number is set in advance by a combination of the feature amounts of the two degradation-simulated images and the correction coefficients associated with the class number are acquired from the first-stage class correspondence correction coefficient storage unit 213.

In addition, a specific example of the pixel value correction process performed by the first-stage processing unit 210 will be described with reference to FIG. 12.

Similarly to FIG. 11 that has been described above, FIG. 12 illustrates the first-stage degradation-simulated image generation unit 211, the first-stage class classification processing unit 212, the first-stage class correspondence correction coefficient storage unit 213, the first-stage tap selection unit 214, and the first-stage image correction unit 215 which are components of the first-stage processing unit 210 and the second-stage degradation-simulated image generation unit 221 which is a component of the second-stage processing unit 210 in the image correction unit 127 illustrated in FIG. 6.

The first-stage degradation-simulated image generation unit 211 generates a ⅛-resolution degradation-simulated image 331 having the same resolution as the positioned low-quality image 162 which is the image to be corrected as a degradation-simulated image of the positioned high-quality image 161.

The second-stage degradation-simulated image generation unit 221 generates a ¼ degradation-simulated image 332 having a resolution that is a quarter of the resolution of the positioned high-quality image 161.

The first-stage class classification processing unit 212 receives the two degradation-simulated images, detects the feature amount of each local region, and specifies a class corresponding to the detected feature amount.

Figure 12:
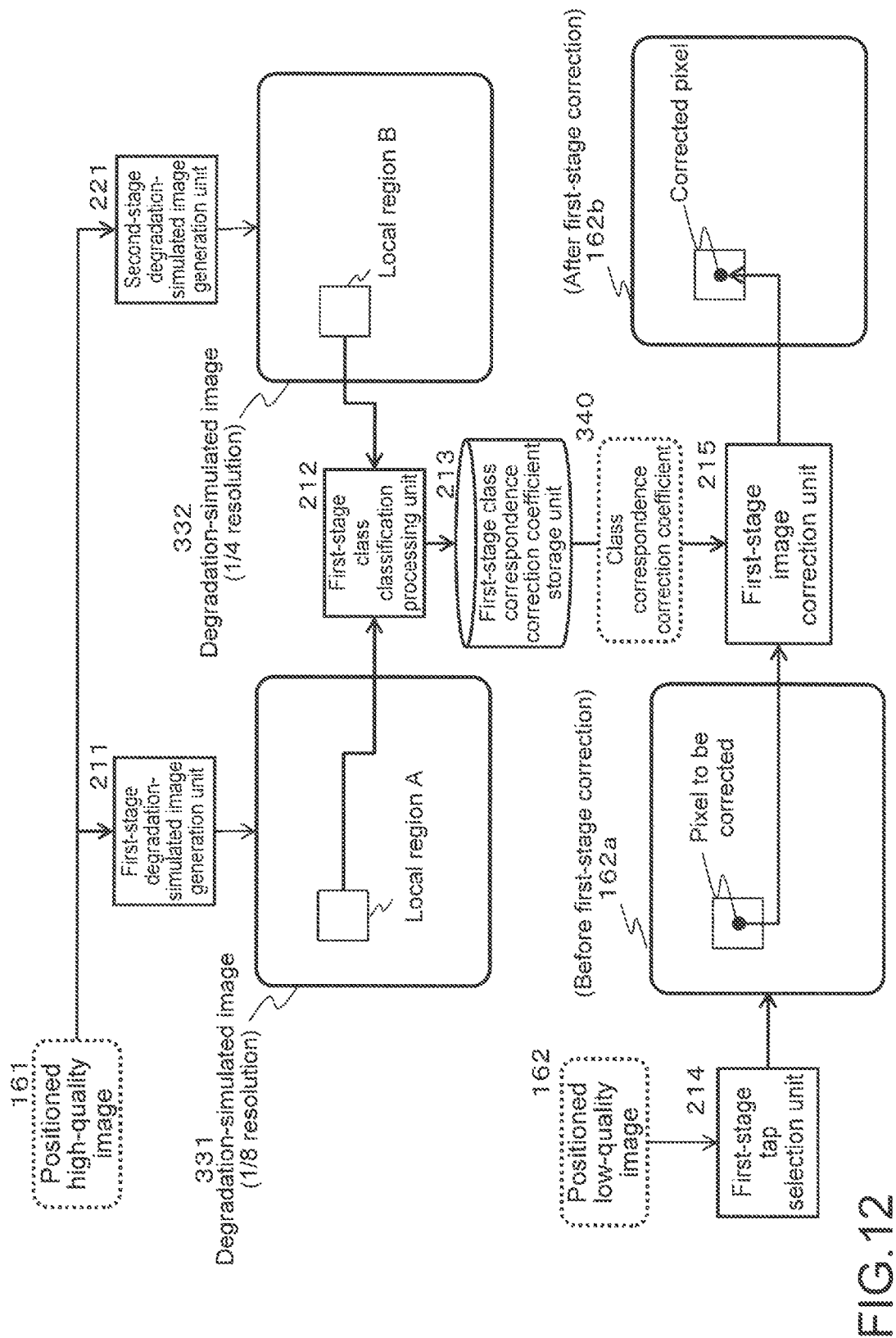
FIG. 12 is a diagram illustrating an example of the process of acquiring a feature amount from an image and performing a correction process using a correction coefficient subjected to class classification.

In the example illustrated in FIG. 12, the feature amounts of a local region A of the ⅛-resolution degradation-simulated image 331 and a local region B of the ¼ degradation-simulated image 332 are extracted.

For example, as described with reference to FIG. 9, the pixel value (brightness) distribution of the local region is extracted from the local regions A and B.

In addition, a class corresponding to the extracted feature amount is identified in accordance with the class classification information described with reference to FIG. 9(2).

The first-stage image correction unit 215 acquires the correction coefficient corresponding to the class specified by the first-stage class classification processing unit 212 from the first-stage class correspondence correction coefficient storage unit 213.

The acquired correction coefficient is a class correspondence correction coefficient 340 illustrated in FIG. 12.

The first-stage image correction unit 215 performs a process of correcting the pixel value of the positioned low-quality image 162, using the class correspondence correction coefficient 340.

It should be noted that a tap selection process of the first-stage tap selection unit 214 is performed as a process in a stage before the pixel value correction process of the first-stage image correction unit 215. As described above, the tap selection process is a process of selecting the reference pixel used to calculate the value of the pixel to be corrected.

For example, the setting of selecting an optimum tap (reference pixel range) in accordance with the feature amounts in the vicinity of the correction pixel can be performed.

It should be noted that, for example, the feature amount acquired from the degraded image of the positioned high-quality image 161 in the first-stage class classification processing unit 212 can be used as the feature amount.

The reference pixel range is specified by the selection of the tap by the first-stage tap selection unit 214 and the value of the pixel to be corrected is calculated using the value of the reference pixel in the reference pixel range and the correction coefficient acquired from the first-stage class correspondence correction coefficient storage unit 213.

For example, the correction value of the pixel to be corrected in a positioned low-quality image (before first-stage correction) 162a illustrated in FIG. 12 is calculated in accordance with the above-mentioned (Expression 1).

The first-stage image correction unit 215 generates a positioned low-quality image (after first-stage correction) 162b having the corrected pixel.

The first-stage processing unit 210 performs the pixel value correction for all of the pixels forming the positioned low-quality image 162.

It should be noted that, in this process, the local regions A and B of the degradation-simulated images 331 and 332 generated from the positioned high-quality image 161 are the same coordinate regions as the pixel regions having, as the center, the pixel to be corrected in the positioned low-quality image 162 which is the image to be corrected.

That is, the process is performed using the captured regions of the same object.

The first-stage processing unit 210 performs a quality improvement process for all of the pixels forming the positioned low-quality image 162 to convert the ⅛-resolution positioned low-quality image 162 into a ¼-resolution image.

The processed image is input to the second-stage processing unit 220.

The second-stage processing unit 220 performs a quality improvement process of converting the ¼-resolution image input from the first-stage processing unit 210 into a ½-resolution image.

In the second-stage processing unit 220, in this process, the second-stage class classification processing unit 222 of the second-stage processing unit 220 receives the ¼ degradation-simulated image which has a resolution that is a quarter of the resolution of the positioned high-quality image 161 and has been generated by the second-stage degradation-simulated image generation unit 221 and the ½ degradation-simulated image which has a resolution that is half the resolution of the positioned high-quality image 161 and has been generated by the third-stage degradation-simulated image generation unit 231, detects the feature amount of each local region, and specifies a class corresponding to the detected feature amount.

The second-stage image correction unit 225 acquires a correction coefficient corresponding to the class specified by the second-stage class classification processing unit 222 from the second-stage class correspondence correction coefficient storage unit 223.

The second-stage image correction unit 225 performs pixel value correction for the low-quality image with a ¼-resolution level input from the first-stage processing unit 210, using the class correspondence correction coefficient.

A quality improvement process of converting the positioned low-quality image 162 into a ½-resolution image is performed by this correction process.

The processed image is input to the third-stage processing unit 230.

The third-stage processing unit 230 performs a quality improvement process of converting the ½-resolution image input from the second-stage processing unit 220 into a 1/1-resolution image. That is, the third-stage processing unit 230 performs a process of improving the resolution of the input image to the same resolution level as that of the positioned high-quality image 161 used as the reference image.

In the third-stage processing unit 230, in this process, the third-stage class classification processing unit 232 of the third-stage processing unit 230 receives the ½ degradation-simulated image which has a resolution that is half the resolution of the positioned high-quality image 161 and has been generated by the third-stage degradation-simulated image generation unit 231 and the positioned high-quality image 161 which is an input image, detects the feature amount of each local region, and specifies a class corresponding to the detected feature amount.

The third-stage image correction unit 235 acquires a correction coefficient corresponding to the class specified by the third-stage class classification processing unit 232 from the third-stage class correspondence correction coefficient storage unit 233.

The third-stage image correction unit 235 performs pixel value correction for the low-quality image with a ½-resolution level input from the second-stage processing unit 220, using the class correspondence correction coefficient.

A quality improvement process of converting the positioned low-quality image 162 into a 1/1-resolution image is performed by this correction process.

That is, the third-stage processing unit 230 performs a process of improving the resolution of the input image to the same resolution level as that of the positioned high-quality image 161 used as the reference image.

As such, the image correction unit of the image processing apparatus according to the present disclosure performs the pixel value correction as a multi-stage process (cascade process) as described with reference to the drawings including FIG. 6.

This is to apply accurate correction coefficients corresponding to a larger number of classes to the processing units in each stage.

As described above, the correction coefficients are classified in accordance with the classes by the learning process which has been performed in advance. The above-mentioned process is performed in order to obtain accurate correction coefficients corresponding to a larger number of classes, that is, the optimum correction coefficients corresponding to the image feature amounts.

The number of classes that can be used by the image correction unit 127 according to this configuration will be described with reference to FIG. 13.

Figure 13:
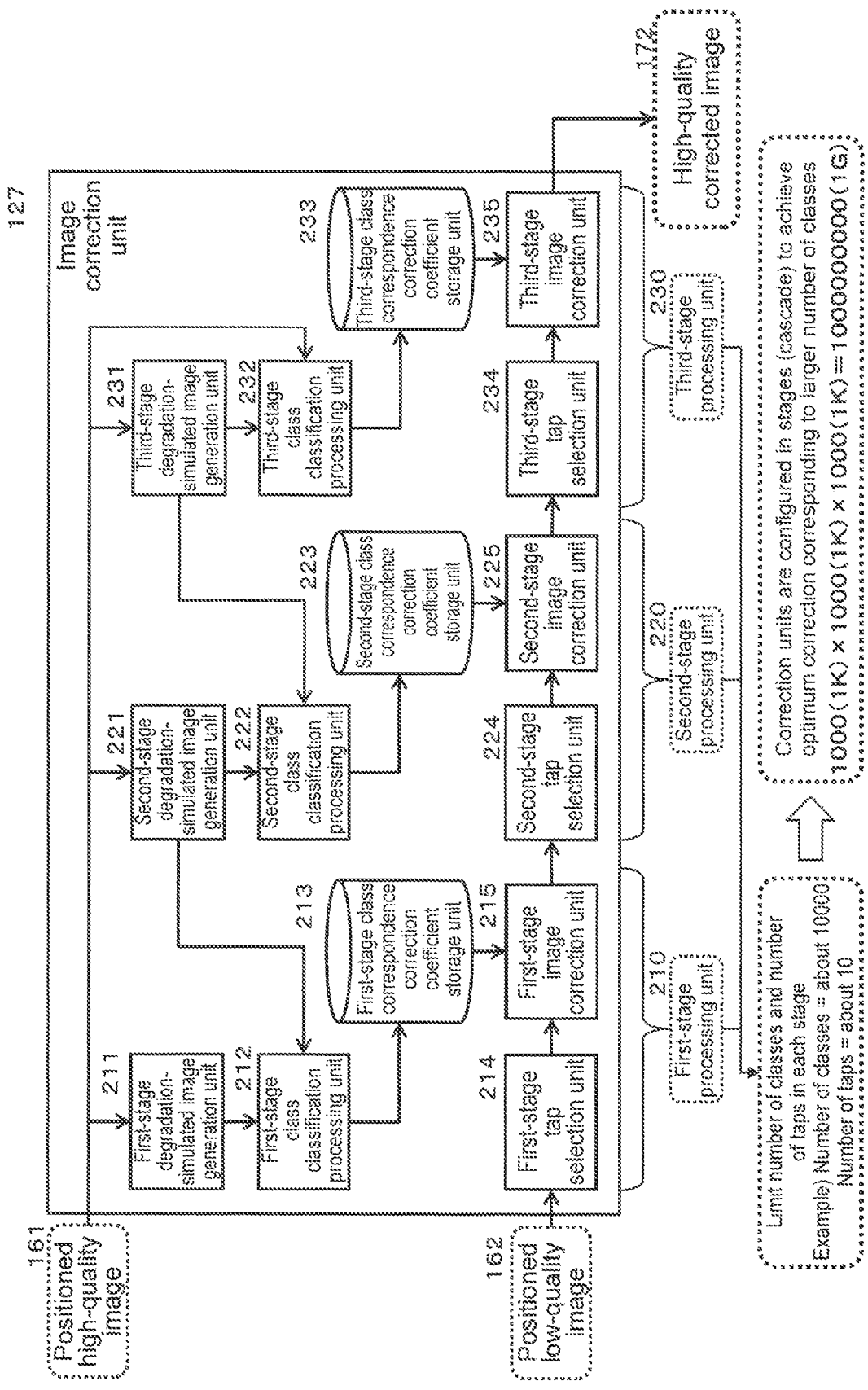
FIG. 13 is a diagram illustrating the multi-stage configuration and process of the image correction unit.

FIG. 13 illustrates the same configuration as that of the image correction unit 127 described with reference to FIG. 6.

The image correction unit 127 illustrated in FIG. 13 includes three-stage correction processing units in the first to third stages. In a case in which the number of classes associated with different correction coefficients in each stage is 1000, in three-stage correction processes in the first to third stages, correction can be performed using different correction coefficients corresponding to 1000×1000× 1000=1000000000, that is, 1K×1K×1K=1G classes.

That is, correction using accurate correction coefficients corresponding to finely classified image characteristics is achieved.

In addition, in the tap selection process, tap selection can be performed by the first-stage to third-stage tap selection units 214 in three stages.

The tap is a reference pixel range that is applied to calculate the corrected pixel value. As described above, for example, the setting of selecting the optimum tap (reference pixel range) in accordance with the feature amounts in the vicinity of the correction pixel can be performed.

The tap selection is performed in three times to select the optimum tap corresponding to the feature amount detected in each stage.

The image processing apparatus according to the present disclosure performs the optimum correction corresponding to the feature amount of each local region of the image, using the above-mentioned process.

6. FOR OTHER EMBODIMENTS

Next, embodiments different from the above-described embodiment will be described.

The following two items will be sequentially described:
(1) For Variation in Feature Amount Used for Image Correction Process; and
(2) For Modification Examples of Multi-stage Configuration.

[6-1. For Example of Feature Amount Usable for Image Correction Process]

First, an example of the feature amount usable for the image correction process will be described.

In the above-described embodiment, in the first-stage to third-stage class classification processing units 212, 222, and 232 of the image correction unit 127 illustrated in FIG. 6, the feature amounts acquired from each degradation-simulated image are used as the pixel value (brightness) distribution information of the local regions as described with reference to FIG. 9.

In the learning process, the pixel value (brightness) distribution information of the local region is acquired from the sample image and the correction coefficient based on the feature amount is calculated.

In addition, in the low-quality image correction process, the pixel value (brightness) distribution information of the local region is acquired from the high-quality image which has been input as the reference image in parallel and correction is performed using the correction coefficient corresponding to the class which corresponds to the feature amount subjected to class classification in the learning process before the correction process.

The feature amount that can be used for the image correction process performed as the quality improvement process in the image processing apparatus according to the present disclosure is not limited to, for example, the pixel value distribution described with reference to FIG. 9 and the process may be performed using various feature amounts.

A plurality of examples of the feature amount applied to the quality improvement process in the image processing apparatus according to the present disclosure will be described with reference to FIG. 14 and the subsequent figures.

Figure 14:
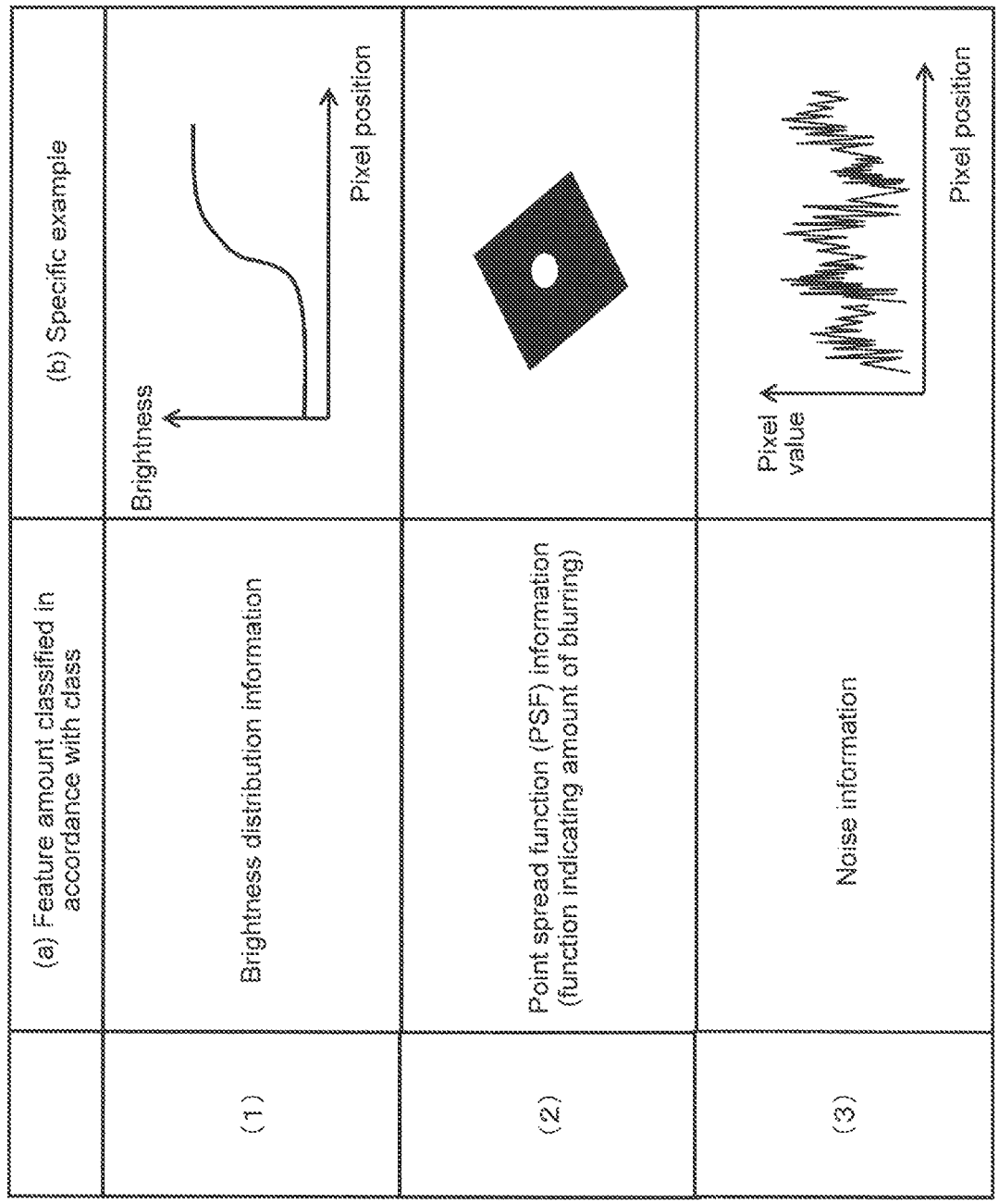
FIG. 14 is a diagram illustrating the type and specific example of the feature amount of an image.

FIG. 14 illustrates an example of the image feature amounts which are acquired from each degradation-simulated image and are used to set classes associated with correction coefficients in the first-stage to third-stage class classification processing units 212, 222, and 232 of the image correction unit 127 illustrated in FIG. 6.

FIG. 14 illustrates the following three types of image feature amounts:
(1) Brightness distribution information;
(2) A point spread function (PSF) (=a function indicating a blurred state); and
(3) Noise information.

"(1) The brightness distribution information" is distribution information of the brightness value of each pixel in an image. A specific example illustrated in FIG. 14(1)(*b*) shows a graph (brightness distribution graph) in which a pixel position is set to the horizontal axis and a brightness value is set to the vertical axis.

In the example illustrated in FIG. 14(1)(*b*), the left side of the graph is a low brightness value and the right side is a high brightness value. This brightness distribution is, for example, a brightness distribution corresponding to an edge region such as the boundary of an object.

It should be noted that this feature amount corresponds to the feature amount described with reference to FIG. 9 and is an image feature amount which can be acquired from the positioned high-quality image 161 or the degradation-simulated image thereof.

"(2) The point spread function (PSF) (=the function indicating a blurred state)" is a point spread function (PSF) which is a function indicating the amount of blurring of an image.

As illustrated in a specific example of FIG. 14(2)(*b*), the point spread function is a function indicating the degree of spread of a pixel value at a certain pixel position to the surrounding pixel values, that is, the amount of blurring.

It should be noted that the point spread function is also an image feature amount which can be acquired from the positioned high-quality image 161 or the degradation-simulated image thereof.

"(3) The noise information" is information indicating noise included in an image. An image captured by the camera has a certain amount of noise.

A specific example illustrated in FIG. 14(3)(*b*) shows a graph (noise distribution graph) in which a pixel position is set to the horizontal axis and a pixel value is set to the vertical axis.

As illustrated in the graph, the pixel value is a value obtained by adding a predetermined amount of noise to the original color or brightness of an object. It should be noted that there are various types of noise such as high-frequency noise and low-frequency noise.

It should be noted that the noise information is also an image feature amount which can be acquired from the positioned high-quality image 161 or the degradation-simulated image thereof.

The three image feature amounts illustrated in FIG. 14 are feature amounts that can be acquired from the sample image in the learning process described with reference to FIG. 7 and are feature amounts that can be acquired from the positioned high-quality image 161 or the degradation-simulated image thereof in the first-stage to third-stage class classification processing units 212, 222, and 232 of the image correction unit 127 illustrated in FIG. 6.

The processes using the feature amounts illustrated in FIGS. 14(1) to 14(3) include a learning process based on the sample image and a process using the same feature amounts as the actual quality improvement process for the low-quality image.

For example, in a case in which the point spread function (PSF) which is a function indicating the amount of blurring of an image illustrated in FIG. 14(2) is used as the feature amount, in the learning process that is performed in advance, a point spread function (PSF) which is a function indicating the amount of blurring of a local region is acquired as the feature amount from the sample image and a correction coefficient subjected to class classification in accordance with the amount of blurring is calculated as a correction coefficient for reducing the amount of blurring on the basis of the feature amount and is then stored in the storage unit (class correspondence correction coefficient storage unit).

In addition, in the low-quality image correction process, a point spread function (PSF) which is a function indicating the amount of blurring is acquired as the feature amount of a local region from the high-quality image which has been input in parallel as the reference image and correction is performed using the correction coefficient corresponding to the feature amount correspondence class subjected to the class classification in the learning process performed in advance.

The image correction units in each processing stage perform, for example, a correction process using an LPF.

The correction coefficient corresponding to the feature amount correspondence class subjected to the class classification is, for example, a multiplication coefficient of the reference pixel set to the LPF.

In addition, for example, in a case in which the amount of noise of an image illustrated in FIG. 14(3) is used as the feature amount, in the learning process that is performed in advance, the amount of noise of a local region is acquired as the feature amount from the sample image and a correction coefficient subjected to class classification in accordance with the amount or type (low frequency/high frequency) of noise is calculated as a correction coefficient for reducing the amount of noise on the basis of the feature amount and is then stored in the storage unit (class correspondence correction coefficient storage unit).

Further, in the low-quality image correction process, the amount or type of noise is acquired as the feature amount of a local region from the high-quality image which has been input in parallel as the reference image and correction is performed using the correction coefficient corresponding to the feature amount correspondence class subjected to the class classification in the learning process performed in advance.

The image correction units in each processing stage perform, for example, a correction process decreasing the noise.

Furthermore, a plurality of different feature amounts may be acquired, a correction coefficient for improving image quality may be calculated in accordance with the acquired plurality of feature amounts, and the correction process may be performed using the correction coefficient.

As such, in the image processing apparatus according to the present disclosure, it is possible to apply various feature amounts.

[6-2. For Other Examples of Multi-Stage Configuration of Image Correction Unit]

In the above-described embodiment, as described with reference to FIG. 6, the example in which the image correction unit 127 has a three-stage configuration of the first-stage to third-stage processing units 210 to 230 and repeats the process of performing image processing in three times.

The number of stages can be set in the image correction unit 127 in various manners.

Various configurations, such as a two-stage configuration and a configuration with four or more stages, are possible.

Figure 15:
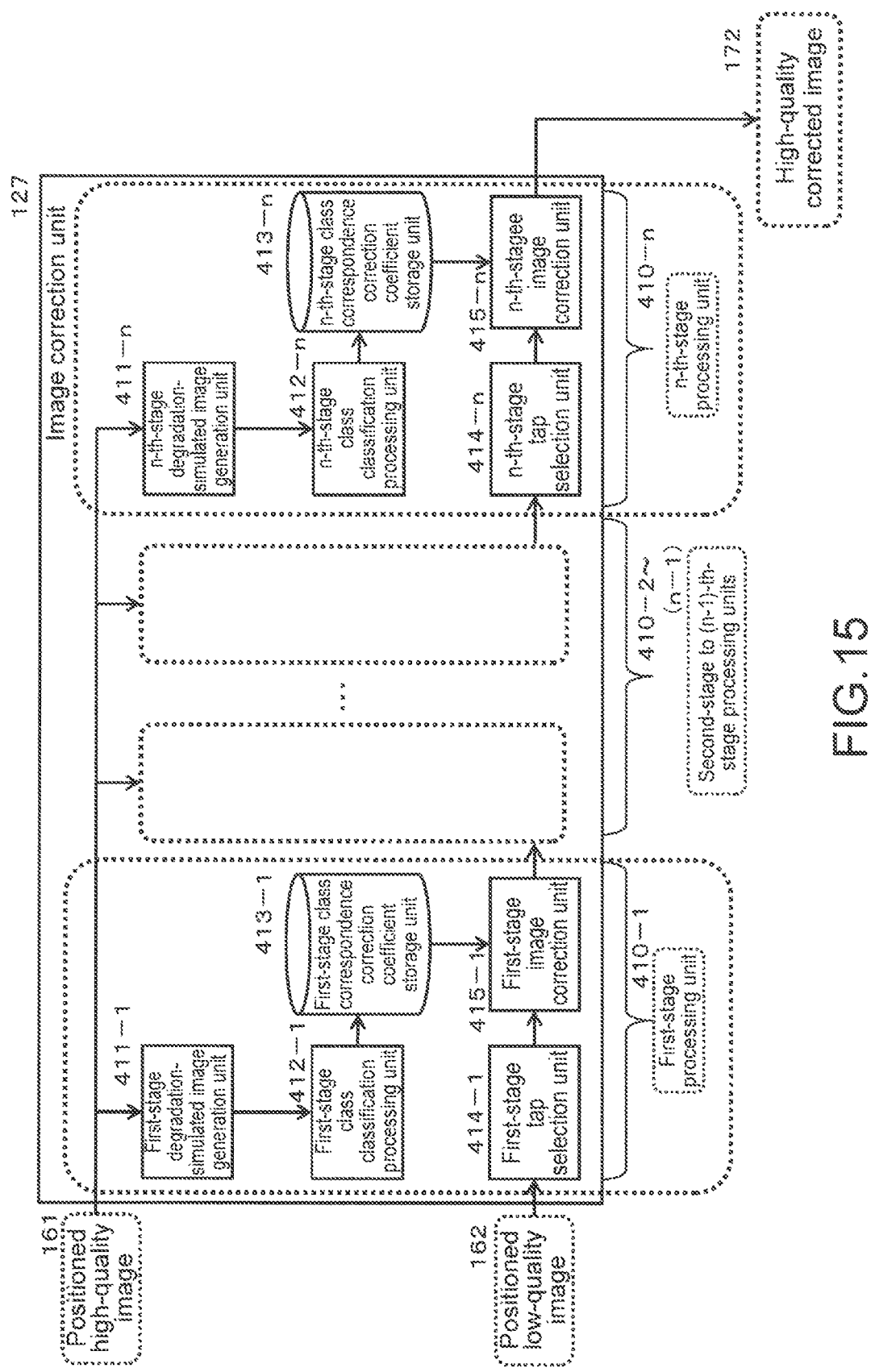
FIG. 15 is a diagram illustrating an example of the multi-stage configuration of the image correction unit.

FIG. 15 illustrates an example of the configuration of the image correction unit 127.

The image correction unit 127 illustrated in FIG. 15 has an n-stage configuration of first-stage to n-th-stage processing units 410-1 to 410-$n$ and repeats a process of performing image processing n times.

The processing units in each stage have the same components and include the following elements:

Degradation-simulated image generation units 411-1 to 411-$n$;

Class classification processing units 412-1 to 412-$n$;

Class correspondence correction coefficient storage units 413-1 to 413-$n$;

Tap selection units 414-1 to 414-$n$; and

Image correction units 415-1 to 415-$n$.

Correction using accurate correction coefficients corresponding to finely classified image characteristics is achieved by the increase in the number of stages.

In addition, in the tap selection process, in each stage, tap selection is possible in various settings and tap selection most suitable for characteristics is possible.

7. FOR SEQUENCE OF PROCESS PERFORMED BY IMAGE PROCESSING APPARATUS

Next, the sequence of the process performed by the image processing apparatus according to the present disclosure will be described with reference to flowcharts illustrated in FIG. 16 and the subsequent figures.

As described in the embodiment, the image processing apparatus according to the present disclosure performs a process which performs the learning process with the sample image to calculate the correction coefficient corresponding to the feature amount based on the learning process, that is, the class correspondence correction coefficient and stores the class correspondence correction coefficient in the class correspondence correction coefficient storage unit which is a storage unit before the correction process for the actual image to be corrected.

Figure 16:
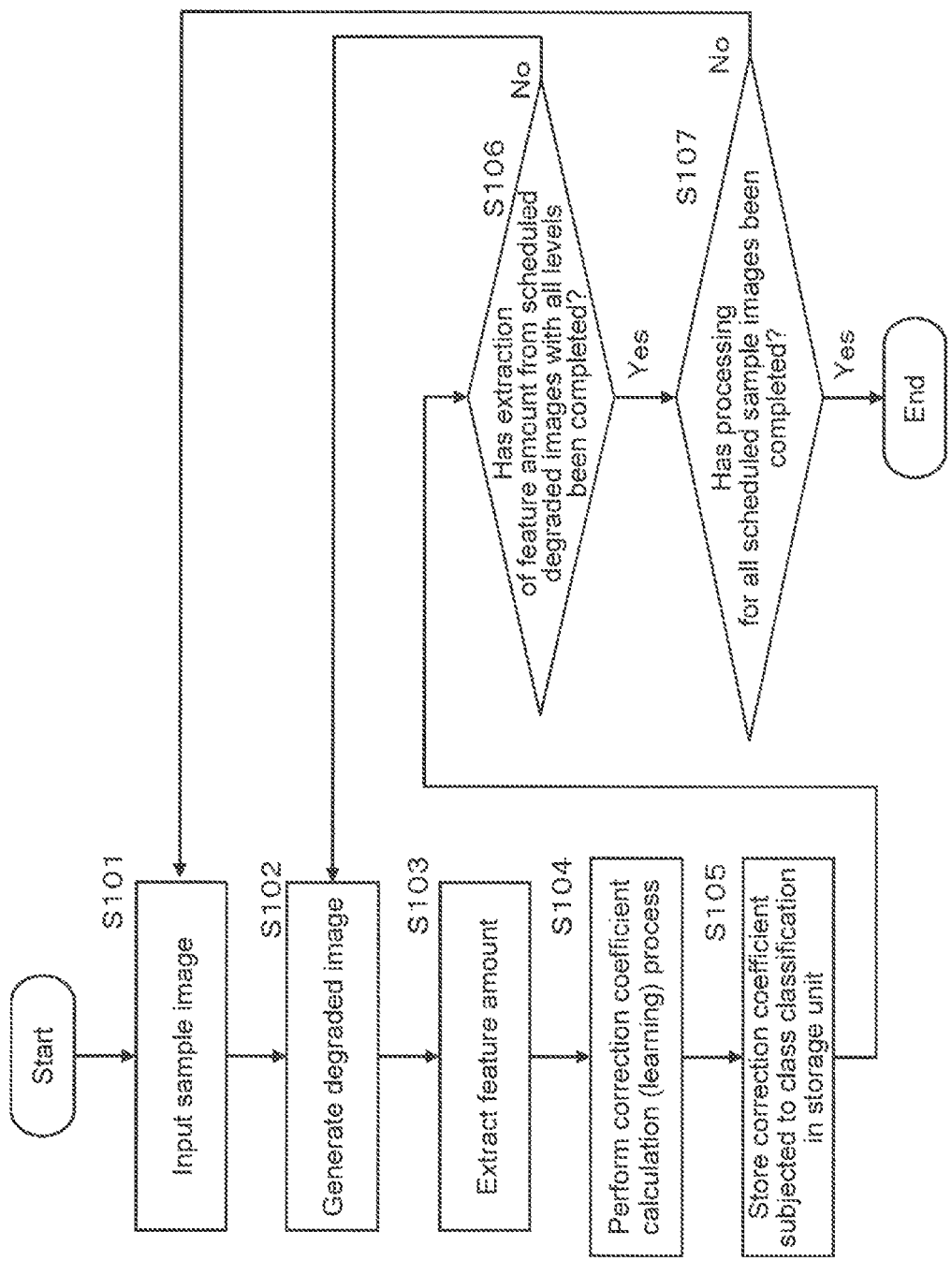
FIG. 16 is a flowchart illustrating the sequence of the learning process performed by the image processing apparatus.

The flowchart illustrated in FIG. 16 is a flowchart illustrating the sequence of the learning process.

Figure 17:
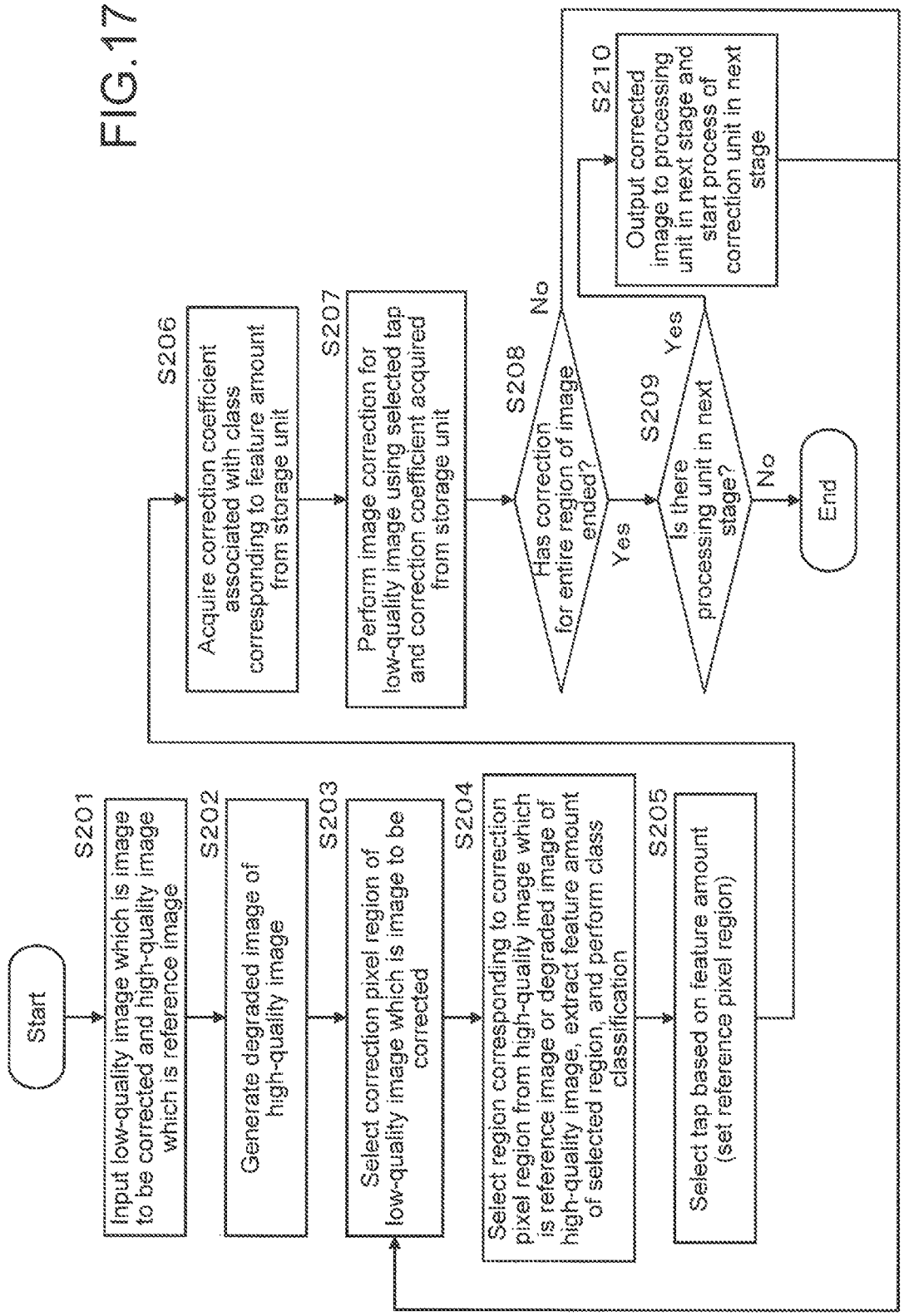
FIG. 17 is a flowchart illustrating the sequence of an image correction process performed by the image processing apparatus.

The flowchart illustrated in FIG. 17 is a flowchart illustrating the sequence of the image correction process performed after the learning process ends.

First, the sequence of the learning process, that is, the sequence of the process which performs the learning process with the sample image to calculate the correction coefficient corresponding to the feature amount based on the learning process, that is, the class correspondence correction coefficient and stores the class correspondence correction coefficient in the class correspondence correction coefficient storage unit which is a storage unit will be described with reference to the flowchart illustrated in FIG. 16.

For example, the process according to the flow illustrated in FIG. 16 is performed under the control of a control unit having a program execution function according to the program stored in the storage unit of the image processing apparatus.

Hereinafter, processes in each step of the flow illustrated in FIG. 16 will be sequentially described.

(Step S101)

First, in Step S101, the image processing apparatus inputs a sample image.

That is, the image processing apparatus inputs a sample image for performing a feature amount extraction process. The sample image is, for example, a high-quality image with high resolution such as a visible image.

It should be noted that, as described with reference to FIG. 7, one high-quality sample image is not input, but a plurality of image data items having various characteristics are input. That is, a plurality of image data items having various characteristics are input, the learning process is performed, and correction coefficients (parameters) according to classes corresponding to different feature amounts generated as the results of learning are stored in the class correspondence correction coefficient storage units 213, 223, and 233 as illustrated in FIG. 7.

(Step S102)

Then, in Step S102, the image processing apparatus performs a degraded image generation process.

This process is the process performed by the degradation-simulated image generation units 211, 221, and 231 described with reference to FIG. 7.

For example, the image processing apparatus generates degraded images with different degradation levels using different low-pass filters (LPFs).

It should be noted that the highest degradation level is desirably exactly equal to the degradation level of the image to be corrected.

(Step S103)

Then, in Step S103, the image processing apparatus performs a process of extracting a feature amount from the input sample image or the degraded image thereof.

This process is the process performed by the learning process execution unit 320 described with reference to FIG. 7.

For example, this process corresponds to a portion of the process in Steps S11 to S13 described with reference to FIG. 7.

In Step S11 described with reference to FIG. 7, the ⅛-resolution degradation-simulated image 302 and the ¼-resolution degradation-simulated image 303 are input and the image feature amount of each predetermined pixel region (local region) of each image is calculated.

(Step S104)

Then, in Step S104, the image processing apparatus calculates a correction coefficient (correction parameter) corresponding to the image feature amount extracted in Step S103 using the learning process.

This process also corresponds to a portion of the process in Steps S11 to S13 described with reference to FIG. 7.

In Step S11 described with reference to FIG. 7, the supervised learning process in which the ¼-resolution degradation-simulated image 303 is a teacher image (restored image) and the ⅛-resolution degradation-simulated image 302 is a student image is performed to acquire the optimum correction coefficients (correction parameters) corresponding to various feature amounts.

This correction coefficient calculation process is performed for all of various sample images.

It should be noted that the learning process using a larger number of sample images is performed to calculate the optimum correction coefficients corresponding to a large number of different feature amounts.

(Step S105)

Then, in Step S105, the image processing apparatus stores the correction coefficients (correction parameters) calculated in Step S104 as the correction coefficients which correspond to each class corresponding to the classification information of the feature amounts in the storage unit, that is, the first-stage class correspondence correction coefficient storage unit 213 illustrated in FIG. 7.

(Step S106)

Then, in Step S106, the image processing apparatus determines whether feature amount extraction for the scheduled degraded images with all levels has been completed.

In a case in which there is an unprocessed degraded image, the process in Step S102 and the subsequent steps is repeatedly performed for the unprocessed image.

This corresponds to the process of sequentially performing Steps S11 to S13 illustrated in FIG. 7.

In a case in which it is determined in Step S106 that the feature amount extraction for the scheduled degraded images with all levels has been completed, the image processing apparatus proceeds to Step S107.

(Step S107)

Then, in Step S107, the image processing apparatus determines whether the process for all of the scheduled sample images has ended.

In a case in which there is an unprocessed sample image, the image processing apparatus returns to Step S101 and performs the process in Step S101 and the subsequent steps for the unprocessed sample image.

As described above, it is desirable that the sample images from which feature amounts are extracted are a large number of image data items having various characteristics. That is, a large number of image data items having various characteristics are input, the learning process is performed, and correction coefficients (parameters) according to classes corresponding to different feature amounts generated as the results of learning are stored in the class correspondence correction coefficient storage units 213, 223, and 233 as illustrated in FIG. 7.

In a case in which it is determined in Step S107 that the process for all of the scheduled sample images has ended, the image processing apparatus ends the process.

It should be noted that, as described above, various feature amounts can be applied as the feature amounts acquired from the sample image in the learning process and various feature amounts described with reference to FIG. 9 or FIG. 14 can be extracted.

Next, the sequence of the image correction process performed after the learning process will be described with reference to the flowchart illustrated in FIG. 17.

The process according to the flow illustrated in FIG. 17 is performed under the control of the control unit having the program execution function according to the program stored in the storage unit of the image processing apparatus.

Hereinafter, processes in each step of the flow illustrated in FIG. 17 will be sequentially described.

(Step S201)

First, in Step S201, the image processing apparatus inputs a low-quality image which is an image to be corrected and a high-quality image which is a reference image.

It should be noted that the images correspond to the positioned high-quality image 161 and the positioned low-quality image 162 illustrated in FIG. 6 and are two images of the same positioned object.

(Step S202)

Then, in Step S202, the image processing apparatus generates the degraded images of the high-quality image which is the reference image.

This process is the process performed by the first-stage degradation-simulated image generation unit 211, the second-stage degradation-simulated image generation unit 221, and the third-stage degradation-simulated image generation unit 231 of the image correction unit 127 illustrated in FIG. 6.

The high-quality image which is the reference image is input to the first-stage degradation-simulated image generation unit 211, the second-stage degradation-simulated image generation unit 221, and the third-stage degradation-simulated image generation unit 231 and is converted into low-resolution images with different levels by processes using different low-pass filters (LPFs).

Specifically, the first-stage degradation-simulated image generation unit 211 generates a degradation-simulated image (for example, a degradation-simulated image having a resolution that is one eighth of the resolution of the high-quality image) having the same resolution level as the low-quality image which is the image to be corrected.

The second-stage degradation-simulated image generation unit 221 generates a degradation-simulated image (for example, a degradation-simulated image having a resolution that is a quarter of the resolution of the high-quality image) having a lower degradation level than the degraded image generated by the first-stage degradation-simulated image generation unit 211.

In addition, the third-stage degradation-simulated image generation unit 231 generates a degradation-simulated image (for example, a degradation-simulated image having a resolution that is half the resolution of the high-quality image) having a lower degradation level than the degraded image generated by the second-stage degradation-simulated image generation unit 221.

(Step S203)

Then, in Step S203, the image processing apparatus selects a correction pixel region of the low-quality image which is the image to be corrected.

In Step S203, the image processing apparatus sequentially selects the pixel to be corrected from the low-quality image which is the image to be corrected.

This corresponds to, for example, the process of selecting the pixel to be corrected in the positioned low-quality image (before first-stage correction) 162*a* illustrated in FIG. 12.

(Step S204)

Then, in Step S204, the image processing apparatus selects a region corresponding to the correction pixel region from the high-quality image which is the reference image or the degraded image thereof, extracts the feature amount of the selected region, and performs a class classification process.

This process is, for example, the process performed by the first-stage class classification processing unit 212 illustrated in FIGS. 6, 11, and 12.

As illustrated in FIG. 12, the first-stage class classification processing unit 212 receives two degradation-simulated images, that is, the ⅛-resolution degradation-simulated image 331 and the ¼ degradation-simulated image 332, detects the feature amount of each local region, and specifies a class corresponding to the detected feature amount.

In the example illustrated in FIG. 12, the feature amounts of the local region A of the ⅛-resolution degradation-simulated image 331 and the local region B of the ¼ degradation-simulated image 332 are extracted.

This process is, for example, the process of extracting the pixel value (brightness) distribution of the local region from the local regions A and B as described with reference to FIG. 9.

In addition, the classes corresponding to the extracted feature amounts are identified in accordance with the class classification information described with reference to FIG. 9(2).

(Step S205)

Then, in Step S205, the image processing apparatus performs a process of selecting a tap (setting a reference pixel region) based on the feature amount.

This process is, for example, the process performed by the first-stage tap selection unit 214 illustrated in FIGS. 6, 11, and 12.

As described with reference to FIGS. 11 and 12, the tap selection process of the first-stage tap selection unit 214 is performed as a process in a stage before the pixel value correction process of the first-stage image correction unit 215. The tap selection process is a process of selecting the reference pixel used to calculate the value of the pixel to be corrected.

This tap selection can be decided on the basis of the feature amount extracted from the high-quality image or the degraded image thereof in Step S204.

For example, the following process is performed: a wide reference region (tap range) is set in a case in which the pixel value amplitude of the local region acquired as the feature amount is small; and a narrow reference region (tap range) is set in a case in which the pixel value amplitude of the local region acquired as the feature amount is large.

(Step S206)

Then, in Step S206, the image processing apparatus acquires a correction coefficient which corresponds to the class corresponding to the feature amount extracted from the high-quality image or the degraded image thereof in Step S204 from the storage unit.

This process is, for example, the process performed by the first-stage image correction unit 215 described with reference to FIGS. 6, 11, and 12.

The first-stage image correction unit 215 acquires the correction coefficient corresponding to the class specified by the first-stage class classification processing unit 212 from the first-stage class correspondence correction coefficient storage unit 213.

The class correspondence correction coefficient 340 illustrated in FIG. 12 is acquired as the correction coefficient.

The first-stage image correction unit 215 performs the process of correcting the pixel value of the low-quality image using the class correspondence correction coefficient 340.

(Step S207)

Then, in Step S207, the image processing apparatus performs an image correction process for the low-quality image, using the tap selected in Step S205 and the correction coefficient corresponding to the feature amount, that is, the class correspondence correction coefficient acquired from the storage unit in Step S206.

For example, the image processing apparatus performs a process of calculating the corrected pixel value y using the above-mentioned (Expression 1), that is, the expression illustrated in FIG. 11.

(Step S208)

Then, in Step S208, the image processing apparatus determines whether the pixel value correction process for the entire region of the low-quality image which is the image to be corrected has been completed.

In a case in which there is an unprocessed pixel, the image processing apparatus performs the process in Step S203 and the subsequent steps for the unprocessed pixel.

In a case in which it is determined in Step S208 that the pixel value correction process for the entire region of the low-quality image which is the image to be corrected has been completed, the image processing apparatus proceeds to Step S209.

(Steps S209 and S210)

Then, in Step S209, the image processing apparatus determines whether there is a processing unit in the next stage.

As described with reference to FIG. 6, the image correction unit 1237 of the image processing apparatus according to the present disclosure has a multi-stage configuration (cascade configuration) of a plurality of stages.

That is, the result of the correction process which is the result of the quality improvement process of the first-stage processing unit is input to the second-stage processing unit and the second-stage processing unit performs the correction process as the quality improvement process. In addition, the result of the correction process which is the result of the quality improvement process of the second-stage processing unit is input to the third-stage processing unit and the third-stage processing unit performs the correction process as the quality improvement process.

In Step S209, the image processing apparatus determines whether there is a next processing stage.

In a case in which there is a next processing stage, the image processing apparatus proceeds to Step S210.

In Step S210, the corrected image is output to the processing unit in the next stage and the correction unit in the next stage starts a process.

That is, the processing unit in the next stage performs the process in Step S203 and the subsequent steps.

In a case in which it is determined in Step S209 that there is no next processing stage, the image processing apparatus ends the process.

As such, the image processing apparatus according to the present disclosure corrects the pixel value using a multi-stage process (cascade process) as described with reference to the drawings including FIG. 6.

This configuration makes it possible for the processing units in each stage to use accurate correction coefficients corresponding to a larger number of classes.

As described above, the correction coefficients are correction coefficients subjected to class classification in accordance with the learning process which is performed in advance. The correction coefficients can be accurate correction coefficients corresponding to a larger number of classes, that is, the optimum correction coefficients corresponding to the image feature amounts.

As described with reference to FIG. 13, for example, in a case in which the number of classes associated with the correction coefficients that can be used in the correction processing units in three stages, that is the first to third stage illustrated in FIG. 13 is 1000, in three-stage correction processes in the first to third stages, correction can be performed using different correction coefficients corresponding to 1000×1000×1000=1000000000, that is, 1K×1K×1K=1G classes.

Correction using accurate correction coefficients corresponding to finely classified image characteristics is achieved by this configuration.

In addition, in the tap selection process, the tap can be selected in three stages of the first-stage to third-stage tap selection units 214 to 234.

The tap is a reference pixel range that is applied to calculate the corrected pixel value. As described above, for example, the setting of selecting the optimum tap (reference pixel range) in accordance with the feature amounts in the vicinity of the correction pixel can be performed.

The tap selection is performed in three times to select the optimum tap corresponding to the feature amount detected in each stage.

In the image processing apparatus according to the present disclosure, optimal correction corresponding to the feature amount of each local region of the image is achieved by this process.

8. FOR EXAMPLE OF HARDWARE CONFIGURATION OF IMAGE PROCESSING APPARATUS

Next, an example of the hardware configuration of the image processing apparatus will be described with reference to FIG. 18.

Figure 18:
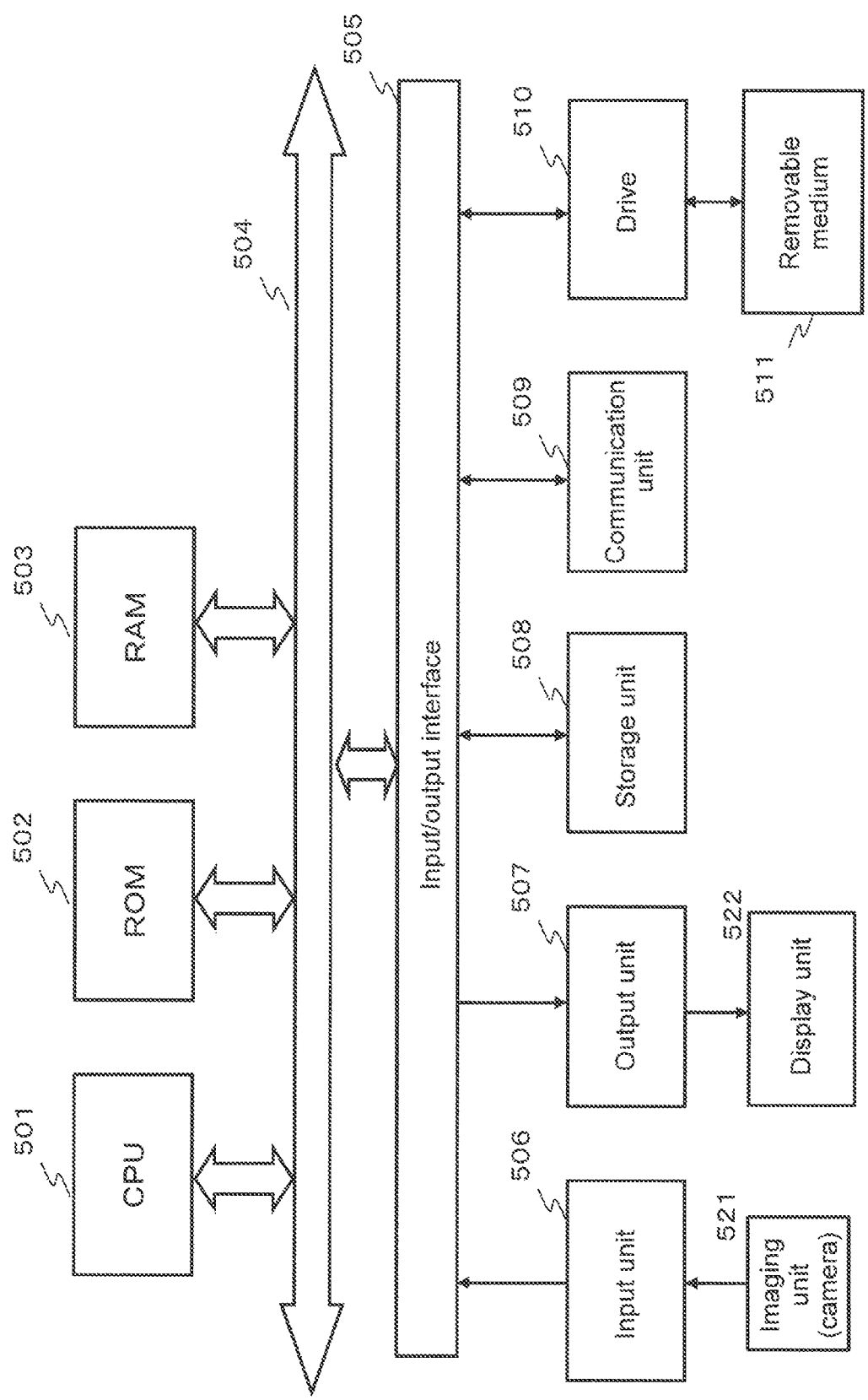
FIG. 18 is a diagram illustrating an example of the hardware configuration of the image processing apparatus.

FIG. 18 is a diagram illustrating an example of the hardware configuration of the image processing apparatus that performs the process according to the present disclosure.

A central processing unit (CPU) 501 functions as a control unit or a data processing unit that performs various processes in accordance with a program stored in a read only memory (ROM) 502 or a storage unit 508. For example, the CPU 501 performs the process according to the sequence described in the above-mentioned embodiment. A random access memory (RAM) 503 stores, for example, programs or data executed by the CPU 501. The CPU 501, the ROM 502, and the RAM 503 are connected to each other by a bus 504.

The CPU 501 is connected to an input/output interface 505 through the bus 504. An input unit 506 that inputs an image captured by an imaging unit 521 and includes various switches, a keyboard, a mouse, and a microphone which can be used by the user to input information and an output unit 507 that outputs data to, for example, a display unit 522 or a speaker are connected to the input/output interface 505. The CPU 501 performs various processes in response to commands input from the input unit 506 and outputs the processing results to, for example, the output unit 507.

The storage unit 508 connected to the input/output interface 505 is, for example, a hard disk drive and stores the programs or various types of data executed by the CPU 501. A communication unit 509 functions as a transmitting and receiving unit for Wi-Fi communication, Bluetooth (registered trademark) (BT) communication, and other types of data communication through a network, such as the Internet or a local area network, and communicates with external apparatuses.

A drive 510 connected to the input/output interface 505 drives a removable medium 511, such as a magnetic disk, an optical disk, a magneto-optical disk, or a semiconductor memory such as a memory card, to record or read data.

9. FOR APPLICATION EXAMPLES OF IMAGE PROCESSING APPARATUS ACCORDING TO PRESENT DISCLOSURE

The technology according to the present disclosure can be applied to various products. For example, the technology according to the present disclosure may be implemented as an apparatus provided in any type of moving object such as a vehicle, an electric vehicle, a hybrid electric vehicle, a motorcycle, a bicycle, a personal mobility, an airplane, a drone, a ship, a robot, a construction machine, and an agricultural machine (tractor).

Figure 19:
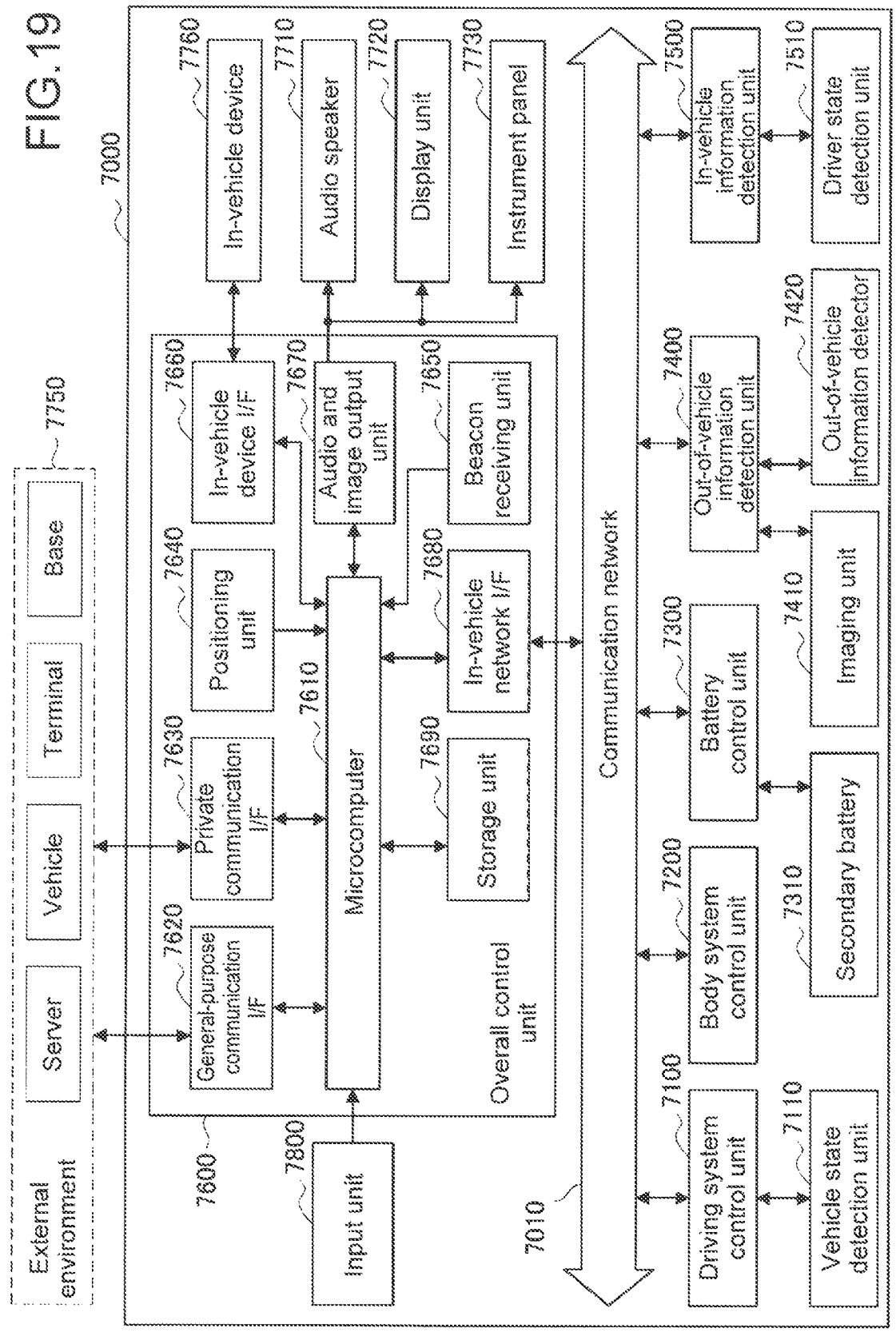
FIG. 19 is a block diagram illustrating an example of the schematic configuration of a vehicle control system.

FIG. 19 is a block diagram illustrating an example of the schematic configuration of a vehicle control system 7000 that is an example of a moving object control system to which the technology according to the present disclosure can be applied. The vehicle control system 7000 includes a plurality of electronic control units connected through a communication network 7010. In the example illustrated in FIG. 19, the vehicle control system 7000 includes a driving system control unit 7100, a body system control unit 7200, a battery control unit 7300, an out-of-vehicle information detection unit 7400, an in-vehicle information detection unit 7500, and an overall control unit 7600. The communication network 7010 connecting the plurality of control units may be an in-vehicle communication network based on any standard, such as a controller area network (CAN), a local interconnect network (LIN), a local area network (LAN), or FlexRay (registered trademark).

Each control unit includes a microcomputer that performs an arithmetic process in accordance with various programs, a storage unit that stores, for example, programs executed by the microcomputer or parameters used for various arithmetic operations, and a driving circuit that drives various apparatuses to be controlled. Each control unit includes a network I/F for communication with other control units through the communication network 7010 and a communication I/F for wired communication or wireless communication with apparatuses or sensors inside or outside the vehicle. In FIG. 19, a microcomputer 7610, a general-purpose communication I/F 7620, a private communication I/F 7630, a positioning unit 7640, a beacon receiving unit 7650, an in-vehicle device I/F 7660, an audio and image output unit 7670, an in-vehicle network I/F 7680, and a storage unit 7690 are illustrated as the functional configurations of the overall control unit 7600. Similarly, the other control units include, for example, a microcomputer, a communication I/F, and a storage unit.

The driving system control unit 7100 controls the operation of devices related to a vehicle driving system in accordance with various programs. For example, the driving system control unit 7100 functions as a control device for a driving force generation device for generating the driving force of the vehicle, such as an internal combustion engine or a driving motor, a driving force transmission mechanism for transmitting the driving force to wheels, a steering mechanism for adjusting the steering of the vehicle, and a braking device for generating the braking force of the vehicle. The driving system control unit 7100 may function as a control device for an antilock brake system (ABS) or an electronic stability control (ESC) device.

A vehicle state detection unit 7110 is connected to the driving system control unit 7100. The vehicle state detection unit 7110 may include, for example, at least one of a gyro sensor that detects an angular velocity in the axial rotational motion of a vehicle body, an acceleration sensor that detects the acceleration of the vehicle, or a sensor for detecting the operation amount of an accelerator pedal, the operation amount of a brake pedal, the steering angle of a steering wheel, an engine speed, or the rotational speed of the wheels. The driving system control unit 7100 performs an arithmetic process using a signal input from the vehicle state detection unit 7110 to control, for example, the internal combustion engine, the driving motor, an electric power steering device, or the braking device.

The body system control unit 7200 controls the operation of various devices provided in the vehicle body in accordance with various programs. For example, the body system control unit 7200 functions as a control device for a keyless entry system, a smart key system, a power window device, and various lamps such as a head lamp, a back lamp, a brake lamp, a blinker, and a fog lamp. In this case, the body system control unit 7200 may receive radio waves transmitted from a portable device substituting a key or signals from various switches. The body system control unit 7200 receives the input radio waves or signals and controls, for example, a door lock device, a power window device, and lamps of the vehicle.

The battery control unit 7300 controls a secondary battery 7310 which is a power supply source of the driving motor in accordance with various programs. Information, such as a battery temperature, a battery output voltage, or the remaining capacity of the battery, is input from a battery device provided with the secondary battery 7310 to the battery control unit 7300. The battery control unit 7300 performs an arithmetic process using these signals to perform temperature adjustment control for the secondary battery 7310 or to control, for example, a cooling device provided in the battery device.

The out-of-vehicle information detection unit 7400 detects information outside the vehicle provided with vehicle control system 7000. For example, at least one of an imaging unit 7410 or the out-of-vehicle information detector 7420 is connected to the out-of-vehicle information detection unit 7400. The imaging unit 7410 includes at least one of a time-of-flight (ToF) camera, a stereo camera, a monocular camera, an infrared camera, or other cameras. The out-of-vehicle information detector 7420 includes at least one of an environment sensor for detecting the current weather or climate or a surrounding information detection sensor for detecting other vehicles, obstacles or pedestrians around the vehicle provided with the vehicle control system 7000.

The environment sensor may be, for example, at least one of a raindrop sensor that detects wet weather, a fog sensor that detects fog, a sunshine sensor that detects sunshine intensity, or a snow sensor that detects snowfall. The surrounding information detection sensor may be at least one of an ultrasonic sensor, a radar device, or a light detection and ranging or laser imaging detection and ranging (LIDAR) device. The imaging unit 7410 and the out-of-vehicle information detector 7420 may be provided as independent sensors or devices or may be provided as devices into which a plurality of sensors or devices are integrated.

Here, FIG. 20 illustrates an example of the installation position of the imaging unit 7410 and the out-of-vehicle information detector 7420. Imaging units 7910, 7912, 7914, 7916, and 7918 are provided, for example, in least one of a front nose, a side mirror, a rear bumper, a back door, or an inner upper part of a windshield of a vehicle 7900. The imaging unit 7910 provided in the front nose and the imaging unit 7918 provided in the inner upper part of the windshield of the vehicle mainly acquire images in front of the vehicle 7900. The imaging units 7912 and 7914 provided in the side mirrors main acquire images on the side of the vehicle 7900. The imaging unit 7916 provided in the rear bumper or the back door mainly acquires an image behind the vehicle 7900. The imaging unit 7918 provided in the inner upper part of the windshield of the vehicle is mainly used to detect, for example, vehicles in front, pedestrians, obstacles, traffic lights, traffic signs, and lanes.

It should be noted that FIG. 20 illustrates an example of the imaging range of each of the imaging units 7910, 7912, 7914, and 7916. An imaging range a indicates the imaging range of the imaging unit 7910 provided in the front nose, imaging ranges b and c indicate the imaging ranges of the imaging units 7912 and 7914 provided in the side mirrors, respectively, and an imaging range d indicates the imaging range of the imaging unit 7916 provided in the rear bumper or the back door. For example, image data captured by the imaging units 7910, 7912, 7914, and 7916 is superimposed to obtain a bird's-eye view image of the vehicle 7900.

Out-of-vehicle information detection units 7920, 7922, 7924, 7926, 7928, and 7930 provided on the front, rear, side, and corners of the vehicle 7900 and in the upper part of the windshield in the vehicle may be, for example, ultrasonic sensors or radar devices. The out-of-vehicle information detection units 7920, 7926, and 7930 provided in the front nose, the rear bumper, and the back door of the vehicle 7900 and in the upper part of the windshield in the vehicle may be, for example, LIDAR devices. These out-of-vehicle information detection units 7920 to 7930 are mainly used to detect, for example, vehicles in front, pedestrians, and obstacles.

Returning to FIG. 19, the description will be continued. The out-of-vehicle information detection unit 7400 directs the imaging unit 7410 to capture an image outside the vehicle and receives the captured image data. In addition, the out-of-vehicle information detection unit 7400 receives information output from the out-of-vehicle information detector 7420 connected thereto. In a case in which the out-of-vehicle information detector 7420 is an ultrasonic sensor, a radar device, or a LIDAR device, the out-of-vehicle information detection unit 7400 transmits, for example, ultrasonic waves or radio waves and receives information of received reflected waves. The out-of-vehicle information detection unit 7400 may perform an object detection process or a distance detection process for, for example, persons, vehicles, obstacles, signs, and characters on a road surface on the basis of the received information. The out-of-vehicle information detection unit 7400 may perform an environment recognition process for recognizing, for example, rainfall, fog, and road surface conditions on the basis of the received information. The out-of-vehicle information detection unit 7400 may calculate the distance to an object outside the vehicle on the basis of the received information.

Further, the out-of-vehicle information detection unit 7400 may perform an image recognition process or a distance detection process that recognizes, for example, persons, vehicles, obstacles, signs, and characters on a road surface on the basis of the received image data. The out-of-vehicle information detection unit 7400 may perform a process, such as distortion correction or positioning, for the received image data and may combine the image data captured by different imaging units 7410 to generate a bird's eye view image or a panoramic image. The out-of-vehicle information detection unit 7400 may perform a viewpoint conversion process using the image data captured by different imaging units 7410.

The in-vehicle information detection unit 7500 detects information in the vehicle. For example, a driver state detection unit 7510 that detects the state of a driver is connected to the in-vehicle information detection unit 7500. The driver state detection unit 7510 may include, for example, a camera that captures an image of the driver, a biological sensor that detects the biological information of the driver, and a microphone that collects sound in the vehicle. The biological sensor is provided, for example, on the surface of a seat or a steering wheel and detects the biological information of a passenger sitting on the seat or the driver who grips the steering wheel. The in-vehicle information detection unit 7500 may calculate the degree of fatigue or concentration of the driver on the basis of the detection information input from the driver state detection unit 7510 or may determine whether the driver falls sleep. The in-vehicle information detection unit 7500 may perform a process, such as a noise canceling process, for the collected audio signal.

The overall control unit 7600 controls the overall operation of the vehicle control system 7000 in accordance with various programs. An input unit 7800 is connected to the overall control unit 7600. The input unit 7800 is implemented by, for example, a device that can be operated to input information by the passenger, such as a touch panel, a button, a microphone, a switch, or a lever. For example, data obtained by voice recognition for voice input by the microphone may be input to the overall control unit 7600. The input unit 7800 may be, for example, a remote control device using infrared rays or other radio waves or an external connection device, such as a mobile phone or a personal digital assistant (PDA) corresponding to the operation of the vehicle control system 7000. The input unit 7800 may be, for example, a camera. In this case, the passenger can input information by gesture. Alternatively, data obtained by detecting the movement of a wearable device worn by the passenger may be input. In addition, the input unit 7800 may include, for example, an input control circuit that generates an input signal on the basis of information input by the passenger through the input unit 7800 and outputs the generated signal to the overall control unit 7600. For example, the passenger operates the input unit 7800 to input various types of data to the vehicle control system 7000 or to instruct a processing operation.

The storage unit 7690 may include a read only memory (ROM) that stores various program executed by a microcomputer and a random access memory (RAM) that stores, for example, various parameters, the result of computation, and sensor values. In addition, the storage unit 7690 may be implemented by a magnetic storage device, such as a hard disk drive (HDD), a semiconductor storage device, an optical storage device, or a magneto-optical storage device.

The general-purpose communication I/F 7620 is a general-purpose communication I/F that relays communication with various apparatuses in an external environment 7750. The general-purpose communication I/F 7620 may be implemented by a cellular communication protocol, such as Global System of Mobile communications (GSM) (registered trademark), WiMAX, long term evolution (LTE), or LTE-advanced (LTE-A), or other wireless communication protocols, such as a wireless LAN (also referred to as Wi-Fi (registered trademark)) and Bluetooth (registered trademark). The general-purpose communication I/F 7620 may be connected to an apparatus (for example, an application server or a control server) on an external network (for example, the Internet, a cloud network, or an operator-specific network) through, for example, a base station or an access point. In addition, the general-purpose communication I/F 7620 may be connected to a terminal (for example, a terminal of a driver, a pedestrian, or a shop, or a machine type communication (MTC) terminal) in the vicinity of the vehicle by, for example, a peer-to-peer (P2P) technology.

The private communication I/F 7630 is a communication I/F that supports a communication protocol designed for use in vehicles. The private communication I/F 7630 may be implemented by a standard protocol, such as wireless access in vehicle environment (WAVE) or dedicated short range communications (DSRC) that is a combination of IEEE 802.11p which is a lower layer and IEEE1609 which is an upper layer, or a cellular communication protocol. The private communication I/F 7630 typically performs V2X communication which is a concept including at least one of vehicle-to-vehicle communication, vehicle-to-infrastructure communication, vehicle-to-home communication, or vehicle-to-pedestrian communication.

The positioning unit 7640 receives, for example, a global navigation satellite system (GNSS) signal (for example, a global positioning system (GPS) signal from a GPS satellite) from a GNSS satellite, performs positioning, and generates positional information including the latitude, longitude, and altitude of the vehicle. It should be noted that the positioning unit 7640 may specify the current position by exchanging signals with a wireless access point or may acquire positional information from a terminal having a positioning function, such as a mobile phone, a PHS, or a smart phone.

The beacon receiving unit 7650 receives, for example, radio waves or electromagnetic waves transmitted from a wireless station installed on a road and acquires information, such as the current position, traffic jams, closure, or the time required. It should be noted that, the functions of the beacon receiving unit 7650 may be included in the private communication I/F 7630.

The in-vehicle device I/F 7660 is a communication interface that relays the connection between the microcomputer 7610 and various in-vehicle devices 7760 provided in the vehicle. The in-vehicle device I/F 7660 may establish a wireless connection using a wireless communication protocol, such as a wireless LAN, Bluetooth (registered trademark), near field communication (NFC), or wireless USB (WUSB). In addition, the in-vehicle device I/F 7660 may establish a wired connection, such as universal serial bus (USB), High-Definition Multimedia Interface (HDMI) (registered trademark), or mobile high-definition link (MHL), through a connection terminal (not illustrated) (and a cable if necessary). The in-vehicle device 7760 may include, for example, at least one of a mobile device or a wearable device of a passenger, or an information device carried in or attached to the vehicle. In addition, the in-vehicle device 7760 may include a navigation device that performs a route search to any destination. The in-vehicle device 7760 exchanges control signals or data signals with these in-vehicle devices 7760.

The in-vehicle network I/F 7680 is an interface that relays communication between the microcomputer 7610 and the communication network 7010. The in-vehicle network I/F 7680 transmits and receives, for example, signals in accordance with a predetermined protocol supported by the communication network 7010.

The microcomputer 7610 of the overall control unit 7600 controls the vehicle control system 7000 in accordance with various programs on the basis of the information acquired through at least one of the general-purpose communication I/F 7620, the private communication I/F 7630, the positioning unit 7640, the beacon receiving unit 7650, the in-vehicle device I/F 7660, or the in-vehicle network I/F 7680. For example, the microcomputer 7610 may calculate a control target value of the driving force generation device, the steering mechanism, or the braking device on the basis of the acquired information inside and outside the vehicle and may output a control command to the driving system control unit 7100. For example, the microcomputer 7610 may perform cooperative control for achieving the function of an advanced driver assistance system (ADAS) including, for example, collision avoidance or shock mitigation of a vehicle, follow-up traveling based on an inter-vehicle distance, vehicle speed maintenance traveling, vehicle collision warning, or vehicle lane departure warning. In addition, the microcomputer 7610 may control, for example, the driving force generation device, the steering mechanism, or the braking device on the basis of the acquired information related to the surroundings of the vehicle to perform cooperative control for the purpose of automatic driving for autonomous driving without depending on the driver's operation.

The microcomputer 7610 may generate three-dimensional distance information between the vehicle and an object, such as the surrounding structure or a person, on the basis of the information acquired through at least one of the general-purpose communication I/F 7620, the private communication I/F 7630, the positioning unit 7640, the beacon receiving unit 7650, the in-vehicle device I/F 7660, or the in-vehicle network I/F 7680 and generate local map information including information around the current position of the vehicle. In addition, the microcomputer 7610 may predict a danger, such as the collision of a vehicle, the approach of a pedestrian, or entrance to a closed road, and generate a warning signal on the basis of the acquired information. The warning signal may be, for example, a signal for generating a warning sound or for turning on a warning lamp.

The audio and image output unit 7670 transmits an output signal of at least one of audio or images to an output device that can visually or aurally notify information to a passenger of the vehicle or the outside of the vehicle. In the example illustrated in FIG. 19, an audio speaker 7710, a display unit 7720, and an instrument panel 7730 are illustrated as the output device. The display unit 7720 may include, for example, at least one of an on-board display or a head-up display. The display unit 7720 may have an augmented reality (AR) display function. The output device may be other devices including a headphone, a wearable device worn by a passenger, such as a glasses-type display, a projector, and a lamp in addition to these devices. In a case in which the output device is a display device, the display device visually displays the results obtained by various processes performed by the microcomputer 7610 or the information received from other control units in various formats, such as text, an image, a table, and a graph. In addition, in a case in which the output device is an audio output device, the audio output device converts an audio signal including the reproduced audio data or acoustic data into an analog signal and aurally outputs the analog signal.

It should be noted that, in the example illustrated in FIG. 19, at least two control units connected through the communication network 7010 may be integrated into one control unit. Alternatively, each control unit may be configured by a plurality of control units. In addition, the vehicle control system 7000 may include other control units (not illustrated). Further, in the above description, some or all of the functions of any control unit may be provided in other control units. That is, as long as information is transmitted and received through the communication network 7010, a predetermined arithmetic process may be performed by any control unit. Similarly, a sensor or a device connected to any control unit may be connected to other control units and a plurality of control units may mutually transmit and receive detection information through the communication network 7010.

It should be noted that a computer program for implementing each function of the image processing apparatus according to the above-described embodiment can be implemented in any control unit. In addition, a computer-readable recording medium having the computer program stored therein may be provided. The recording medium is, for example, a magnetic disk, an optical disk, a magneto-optical disk, or a flash memory. Further, the computer program may be distributed through, for example, network, without using the recording medium.

In the vehicle control system 7000 described above, the image processing apparatus according to the above-described embodiment can be applied to the overall control unit 7600 according to the application example illustrated in FIG. 19. For example, a CPU 801 of the image processing apparatus illustrated in FIG. 20 corresponds to the microcomputer 7610 of the overall control unit 7600 illustrated in FIG. 19, a ROM 802, a RAM 803, and a storage unit 808 of the image processing apparatus illustrated in FIG. 20 correspond to the storage unit 7690 of the overall control unit 7600 illustrated in FIG. 19, and a communication unit 809 of the image processing apparatus illustrated in FIG. 20 corresponds to the in-vehicle network I/F 7680 of the overall control unit 7600 illustrated in FIG. 19.

In addition, at least some of the components of the above-mentioned image processing apparatus may be implemented in a module (for example, an integrated circuit module configured by one die) for the overall control unit 7600 illustrated in FIG. 19. Alternatively, the above-mentioned image processing apparatus may be implemented by a plurality of control units of the vehicle control system 7000 illustrated in FIG. 19.

10. SUMMARY OF CONFIGURATION OF PRESENT DISCLOSURE

The embodiments of the present disclosure have been described in detail above with reference to the specific embodiments. However, it is obvious that those skilled in the art can make modifications and substitutions of the embodiments without departing from the scope and spirit of the present disclosure. That is, the invention has been disclosed in the form of illustration and should not be construed as being limited to the embodiments. The claims need be referred to in order to determine the scope of the present disclosure.

It should be noted that the technology disclosed in the specification can have the following configuration.

(1) An image processing apparatus including:
an image correction unit that repeatedly performs an image correction process using a plurality of processing units in at least two stages which include first-stage to final-stage processing units, in which
the image correction unit inputs a low-quality image which is an image to be corrected and a high-quality image which is a reference image,
each of the plurality of processing units in each stage performs a correction process for the low-quality image, using a class correspondence correction coefficient classified in accordance with a class corresponding to a feature amount extracted from the high-quality image or a degraded image of the high-quality image, and
the class correspondence correction coefficient is generated by a learning process.

(2) The image processing apparatus according to (1), in which
among the plurality of processing units in each stage, a processing unit in a previous stage performs the correction process for the low-quality image, using a class correspondence correction coefficient corresponding to a feature amount extracted from a degraded image of the high-quality image which has a higher degradation level than that in a processing unit in a subsequent stage.

(3) The image processing apparatus according to (1) or (2), in which
the first-stage processing unit performs the correction process for the low-quality image, using a class correspondence correction coefficient corresponding to a feature amount extracted from a degraded image of the high-quality image having a degradation level that is substantially equal to a degradation level of the low-quality image which is the image to be corrected.

(4) The image processing apparatus according to any one of (1) to (3), in which
the class correspondence correction coefficient is generated by the learning process which is performed in advance on the basis of a sample image.

(5) The image processing apparatus according to (4), in which
the class correspondence correction coefficient corresponds to a feature amount extracted from the sample image or a degraded image of the sample image, and
among the plurality of processing units in each stage, the processing unit in the previous stage performs the correction process, using a class correspondence correction coefficient corresponding to a feature amount extracted from an image which has a higher degradation level than that in the processing unit in the subsequent stage.

(6) The image processing apparatus according to any one of (1) to (5), in which
among the plurality of processing units in each stage, the processing unit in the previous stage performs the correction process for the low-quality image, using a class correspondence correction coefficient corresponding to a feature amount extracted from an image which has a lower resolution than that in the processing unit in the subsequent stage.

(7) The image processing apparatus according to any one of (1) to (6), in which
the class correspondence correction coefficient is a correction coefficient associated with a set class based on a combination of a feature amount of an image with a high degradation level and a feature amount of an image with a low degradation level.

(8) The image processing apparatus according to any one of (1) to (7), in which
the class correspondence correction coefficient includes a multiplication coefficient corresponding to a reference pixel used in a filter that calculates a value of a pixel to be corrected.

(9) The image processing apparatus according to any one of (1) to (8), in which
each of the plurality of processing units in each stage includes a tap selection unit that sets a reference pixel range which is referred to in a case in which a correction value of the pixel to be corrected in the low-quality image which is the image to be corrected is calculated.

(10) The image processing apparatus according to (9), in which
the tap selection unit sets the reference pixel range in accordance with a feature amount of a pixel region including the pixel to be corrected.

(11) The image processing apparatus according to any one of (1) to (10), in which
the feature amount is any one of:
(a) brightness distribution information;
(b) blurred state information; and
(c) noise information.

(12) The image processing apparatus according to any one of (1) to (11), in which
the low-quality image which is the image to be corrected is a far-infrared image or a fluorescent image.

(13) The image processing apparatus according to any one of (1) to (12), in which
the high-quality image which is the reference image is a visible image.

(14) The image processing apparatus according to any one of (1) to (13) further including:
a high-quality imaging unit that performs a process of capturing the visible image; and
a low-quality imaging unit that performs a process of capturing the far-infrared image or the fluorescent image, in which
the image correction unit receives a high-quality image and a low-quality image captured by the high-quality imaging unit and the low-quality imaging unit and performs the correction process for the low-quality image.

(15) An image processing method to be performed in an image processing apparatus including an image correction unit that repeatedly performs an image correction process using a plurality of processing units in at least two stages which include first-stage to final-stage processing units, the method including:
an image input step of allowing the image correction unit to input a low-quality image which is an image to be corrected and a high-quality image which is a reference image; and
a correction step of allowing each of the plurality of processing units in each stage to perform a correction process for the low-quality image, using a class correspondence correction coefficient classified in accordance with a class corresponding to a feature amount extracted from the high-quality image or a degraded image of the high-quality image, in which
the class correspondence correction coefficient used in the correction step is generated by a learning process.

(16) A program that causes an image processing apparatus including an image correction unit that repeatedly performs an image correction process using a plurality of processing units in at least two stages which include first-stage to final-stage processing units to perform image processing, in which
the program causes the image correction unit to perform an image input step of inputting a low-quality image which is an image to be corrected and a high-quality image which is a reference image and causes each of the plurality of processing units in each stage to perform a correction step of performing a correction process for the low-quality image, using a class correspondence correction coefficient classified in accordance with a class corresponding to a feature amount extracted from the high-quality image or a degraded image of the high-quality image, and
the class correspondence correction coefficient used in the correction step is generated by a learning process.

In addition, a series of processes described in the specification may be implemented by hardware, software, or a combination thereof. In a case in which the processes are implemented by software, a program having a processing sequence recorded thereon may be installed in a memory of a computer incorporated into dedicated hardware and then executed, or the program may be installed in a general-purpose computer capable of performing various processes and then executed. For example, the program may be recorded on a recording medium in advance. The program may be installed from the recording medium to the computer. Alternatively, the program may be received by the computer through a network, such as a local area network (LAN) or the Internet, and then installed in a recording medium, such as a hard disk drive, provided in the computer.

It should be noted that the various processes described in the specification are not only performed in time series in accordance with the description, but also may be performed in parallel or individually in accordance with the processing capability of the apparatus performing the processes or if needed. Further, in the specification, the system is a logical set configuration of a plurality of apparatuses and is not limited to the configuration in which the apparatuses are provided in the same housing.

INDUSTRIAL APPLICABILITY

As described above, according to the configuration of an embodiment of the present disclosure, an apparatus and a method that perform a process of improving the quality of a low-quality image, such as a far-infrared image, are achieved.

Specifically, for example, the apparatus includes an image correction unit that repeatedly performs an image correction process using a plurality of processing units in at least two stages. The image correction unit inputs a low-quality image which is an image to be corrected and a high-quality image which is a reference image. Each of the processing units in each stage performs a correction process for the low-quality image, using a class correspondence correction coefficient corresponding to a feature amount extracted from a degraded image of the high-quality image. A processing unit in a previous stage performs the correction process, using a class correspondence correction coefficient corresponding to a feature amount extracted from an image having a higher degradation level than that in a processing unit in a subsequent stage. The class correspondence correction coefficient is generated by a learning process.

An apparatus and a method that perform a process of improving the quality of a low-quality image, such as a far-infrared image, are achieved by these processes.

REFERENCE SIGNS LIST 10 living body tissue
11 blood vessel
20 visible image
21 infrared image
100 image processing apparatus
101 control unit
102 storage unit
103 codec
104 input unit
105 output unit
106 imaging unit
107 high-quality imaging unit
108 low-quality imaging unit
111 first imaging element
112 second imaging element
120 image processing unit
121 scaler
122 disparity amount and movement amount detection unit
123 image positioning unit
127 image correction unit
151 high-quality image
152 low-quality image
161 positioned high-quality image
162 positioned low-quality image 172 high-quality corrected image
211, 221, 231, 411 degradation-simulated image generation unit
212, 222, 232, 412 class classification processing unit
213, 223, 233, 413 class correspondence correction coefficient storage unit
214, 224, 234, 414 tap selection unit
215, 225, 235, 415 image correction unit
501 CPU
502 ROM
503 RAM
504 bus
505 input/output interface
506 input unit
507 output unit
508 storage unit
509 communication unit
510 drive
511 removable medium
521 imaging unit
522 display unit

The invention claimed is:

1. An image processing apparatus comprising:
an image correction unit that repeatedly performs an image correction process using a plurality of processing units in at least two stages which include first-stage to final-stage processing units, wherein
the image correction unit inputs a low-quality image which is an image to be corrected and a high-quality image which is a reference image,
each of the plurality of processing units in each stage performs a correction process for the low-quality image, using a class correspondence correction coefficient classified in accordance with a class corresponding to a feature amount extracted from the high-quality image or a degraded image of the high-quality image,
the class correspondence correction coefficient is generated by a learning process,
the first-stage processing unit performs the correction process for the low-quality image, using a class correspondence correction coefficient corresponding to a feature amount extracted from a degraded image of the high-quality image having a degradation level that is substantially equal to a degradation level of the low-quality image which is the image to be corrected, and
wherein the image correction unit and the plurality of processing units are each implemented via at least one processor.

2. The image processing apparatus according to claim 1, wherein
among the plurality of processing units in each stage, a processing unit in a previous stage performs the correction process for the low-quality image, using a class correspondence correction coefficient corresponding to a feature amount extracted from a degraded image of the high-quality image which has a higher degradation level than that in a processing unit in a subsequent stage.

3. The image processing apparatus according to claim 1, wherein
the class correspondence correction coefficient is generated by the learning process which is performed in advance on a basis of a sample image.

4. The image processing apparatus according to claim 3, wherein
the class correspondence correction coefficient corresponds to a feature amount extracted from the sample image or a degraded image of the sample image, and
among the plurality of processing units in each stage, a processing unit in a previous stage performs the correction process, using a class correspondence correction coefficient corresponding to a feature amount extracted from an image which has a higher degradation level than that in a processing unit in a subsequent stage.

5. The image processing apparatus according to claim 1, wherein
among the plurality of processing units in each stage, a processing unit in a previous stage performs the correction process for the low-quality image, using a class correspondence correction coefficient corresponding to a feature amount extracted from an image which has a lower resolution than that in a processing unit in a subsequent stage.

6. The image processing apparatus according to claim 1, wherein
the class correspondence correction coefficient is a correction coefficient associated with a set class based on a combination of a feature amount of an image with a high degradation level and a feature amount of an image with a low degradation level.

7. The image processing apparatus according to claim 1, wherein
the class correspondence correction coefficient includes a multiplication coefficient corresponding to a reference pixel applied to a filter that calculates a value of a pixel to be corrected.

8. The image processing apparatus according to claim 1, wherein
each of the plurality of processing units in each stage includes a tap selection unit that sets a reference pixel range which is referred to in a case in which a correction value of a pixel to be corrected in the low-quality image which is the image to be corrected is calculated.

9. The image processing apparatus according to claim 8, wherein
the tap selection unit sets the reference pixel range in accordance with a feature amount of a pixel region including the pixel to be corrected.

10. The image processing apparatus according to claim 1, wherein
the feature amount is any one of:
(a) brightness distribution information;
(b) blurred state information; and
(c) noise information.

11. The image processing apparatus according to claim 1, wherein
the low-quality image which is the image to be corrected is a far-infrared image or a fluorescent image.

12. The image processing apparatus according to claim 1, wherein
the high-quality image which is the reference image is a visible image.

13. An image processing apparatus comprising:
an image correction unit that repeatedly performs an image correction process using a plurality of processing units in at least two stages which include first-stage to final-stage processing units;
a high-quality imaging unit that performs a process of capturing a visible image; and a low-quality imaging unit that performs a process of capturing a far-infrared image or a fluorescent image, wherein the image correction unit receives a high-quality image and a low-quality image captured by the high-quality imaging unit and the low-quality imaging unit and performs the correction process for the low-quality image, the low-quality image is an image to be corrected and the high-quality image is a reference image, each of the plurality of processing units in each stage performs a correction process for the low-quality image, using a class correspondence correction coefficient classified in accordance with a class corresponding to a feature amount extracted from the high-quality image or a degraded image of the high-quality image, the class correspondence correction coefficient is generated by a learning process, and wherein the image correction unit, the plurality of processing units, the high-quality imaging unit, and the low-quality imaging unit are each implemented via at least one processor.

14. An image processing method performed in an image processing apparatus that includes an image correction unit that repeatedly performs an image correction process using a plurality of processing units in at least two stages which include first-stage to final-stage processing units, the image correction unit and the plurality of processing units each being implemented via at least one processor, the method comprising:

inputting, by the image correction unit, a low-quality image which is an image to be corrected and a high-quality image which is a reference image; and performing, by each of the plurality of processing units in each stage, a correction process for the low-quality image, using a class correspondence correction coefficient classified in accordance with a class corresponding to a feature amount extracted from the high-quality image or a degraded image of the high-quality image, wherein the class correspondence correction coefficient used in the correction process is generated by a learning process, and the first-stage processing unit performs the correction process for the low-quality image, using a class correspondence correction coefficient corresponding to a feature amount extracted from a degraded image of the high-quality image having a degradation level that is substantially equal to a degradation level of the low-quality image which is the image to be corrected.

15. A non-transitory computer-readable medium having embodied thereon a program, which when executed by one or more processors of an image processing apparatus that also includes an image correction unit that repeatedly performs an image correction process using a plurality of processing units in at least two stages which include first-stage to final-stage processing units whereby the image correction unit and the plurality of processing units are each implemented via at least one processor, causes the image processing apparatus to execute an image processing method, the method comprising:

inputting, by the image correction unit, a low-quality image which is an image to be corrected and a high-quality image which is a reference image; and performing, by each of the plurality of processing units in each stage, a correction process for the low-quality image, using a class correspondence correction coefficient classified in accordance with a class corresponding to a feature amount extracted from the high-quality image or a degraded image of the high-quality image, wherein the class correspondence correction coefficient used in the correction process is generated by a learning process, and the first-stage processing unit performs the correction process for the low-quality image, using a class correspondence correction coefficient corresponding to a feature amount extracted from a degraded image of the high-quality image having a degradation level that is substantially equal to a degradation level of the low-quality image which is the image to be corrected.

* * * * *